US012117182B2

(12) United States Patent
Nishijima et al.

(10) Patent No.: US 12,117,182 B2
(45) Date of Patent: Oct. 15, 2024

(54) HEATING COOKING APPARATUS

(71) Applicant: SHARP KABUSHIKI KAISHA, Sakai (JP)

(72) Inventors: Masahiro Nishijima, Sakai (JP); Masayuki Iwamoto, Sakai (JP); Shinji Asami, Sakai (JP); Tsuyoshi Ootani, Sakai (JP); Hiromi Suenaga, Sakai (JP); Tomohiro Kitaura, Sakai (JP); Yu Shinohara, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 364 days.

(21) Appl. No.: 17/631,376

(22) PCT Filed: Mar. 16, 2020

(86) PCT No.: PCT/JP2020/011444
§ 371 (c)(1),
(2) Date: Jan. 28, 2022

(87) PCT Pub. No.: WO2021/019824
PCT Pub. Date: Feb. 4, 2021

(65) Prior Publication Data

US 2022/0325903 A1 Oct. 13, 2022

(30) Foreign Application Priority Data

Jul. 31, 2019 (JP) ................................ 2019-141448

(51) Int. Cl.
*F24C 15/32* (2006.01)
*H05B 6/64* (2006.01)

(52) U.S. Cl.
CPC ......... *F24C 15/325* (2013.01); *H05B 6/6473* (2013.01)

(58) Field of Classification Search
CPC ............................ F24C 15/325; H05B 6/6473
(Continued)

(56) References Cited

U.S. PATENT DOCUMENTS 2,957,067 A 10/1960 Scofield et al.
5,485,780 A * 1/1996 Koether ................. F24C 15/16 219/400
(Continued)

FOREIGN PATENT DOCUMENTS

CN 103884030 A 6/2014
CN 203642276 U 6/2014
(Continued)

OTHER PUBLICATIONS

Third Party Observation concerning the International Application No. PCT/JP2020/011444 mailed on Jun. 30, 2021.

*Primary Examiner* — Avinash A Savani
(74) *Attorney, Agent, or Firm* — ScienBiziP, P.C.

(57) ABSTRACT

A heating cooking apparatus includes a heating cooking chamber (100A) and an air sending unit (14). The heating cooking chamber (100A) accommodates an object to be heated. The air sending unit (14) supplies hot air (F1) to the heating cooking chamber (100A). The air sending unit (14) includes a suction hole portion (14D) positioned on a predetermined side of the heating cooking chamber (100A) and a blow-out hole portion (14C) positioned on the predetermined side. The air sending unit (14) suctions air inside the heating cooking chamber (100A) through the suction hole portion (14D) and blows air into the heating cooking chamber (100A) through the blow-out hole portion (14C).

2 Claims, 18 Drawing Sheets

(58) Field of Classification Search
USPC .......................................................... 126/1 R
See application file for complete search history.

(56) References Cited

U.S. PATENT DOCUMENTS

| | | | | |
|---|---|---|---|---|
| 6,114,665 | A | 9/2000 | Garcia et al. | |
| 6,615,819 | B1 * | 9/2003 | Hernandez Burgos | F24C 15/322 126/273 R |
| 8,212,188 | B2 * | 7/2012 | Kim | F24C 15/18 219/400 |
| 8,253,084 | B2 | 8/2012 | Toyoda et al. | |
| 10,154,549 | B2 | 12/2018 | Nasu et al. | |
| 2006/0137675 | A1 * | 6/2006 | Kim | F24C 15/325 126/21 A |
| 2006/0225727 | A1 * | 10/2006 | Kim | F24C 15/006 126/21 A |
| 2010/0059035 | A1 * | 3/2010 | Nam | H05B 3/48 126/21 A |
| 2010/0133263 | A1 | 6/2010 | Toyoda et al. | |
| 2012/0187115 | A1 | 7/2012 | Toyoda et al. | |
| 2012/0192725 | A1 | 8/2012 | Toyoda et al. | |
| 2015/0000539 | A1 * | 1/2015 | Tcaciuc | F24C 15/325 99/447 |
| 2017/0171921 | A1 | 6/2017 | Nasu et al. | |
| 2017/0343221 | A1 * | 11/2017 | Swayne | F24C 15/327 |
| 2022/0272800 | A1 * | 8/2022 | Hu | H05B 3/141 |

FOREIGN PATENT DOCUMENTS

| | | | |
|---|---|---|---|
| EP | 3514456 | A1 | 7/2019 |
| GB | 2076530 | A | 12/1981 |
| JP | S56149804 | U | 11/1981 |
| JP | 57-166427 | A | 10/1982 |
| JP | 61-143623 | A | 7/1986 |
| JP | H0590209 | U | 12/1993 |
| JP | H06281148 | A | 10/1994 |
| JP | 2008229152 | A | 10/2008 |
| JP | 2010133634 | A | 6/2010 |
| JP | 2015-025646 | A | 2/2015 |
| JP | 2018179381 | A | 11/2018 |
| KR | 20010004083 | A | 1/2001 |

* cited by examiner

HEATING COOKING APPARATUS

TECHNICAL FIELD

The present invention relates to a heating cooking apparatus.

BACKGROUND ART

PTL 1 discloses a pull-out heating cooking apparatus. The pull-out heating cooking apparatus disclosed in PTL 1 includes a heating cooking apparatus main body and a pull-out body. The heating cooking apparatus main body includes a heating cooking chamber. The pull-out body can be drawn toward the outside of the heating cooking apparatus main body from a state where the pull-out body is accommodated in the heating cooking chamber.

Heating functions of the pull-out heating cooking apparatus disclosed in PTL 1 include a microwave heating function and a rapid hot air heating function. The microwave heating function is a function of applying microwaves toward an object to be heated. The rapid hot air heating function is a function of blowing hot air from a top blow-out port and a side blow-out port toward an object to be heated and suctioning hot air from a side suction port. The top blow-out port is formed in a top wall of the heating cooking chamber. The side blow-out port is formed in a left side wall of the heating cooking chamber. The side suction port is formed in a back side wall of the heating cooking chamber.

CITATION LIST

Patent Literature

PTL 1: JP 2010-133634 A

SUMMARY OF INVENTION

Technical Problem

Further, in recent years, there has been a demand for reducing the time taken to heat a predetermined region, such as only a center region, in a heating cooking chamber by hot air.

In light of the above-described problem, an object of the present invention is to provide a heating cooking apparatus that can reduce the time taken to heat a predetermined region in a heating cooking chamber by hot air.

Solution to Problem

A heating cooking apparatus of the present invention includes a heating cooking chamber, an air sending unit, and a first heater. The heating cooking chamber accommodates an object to be heated. The air sending unit supplies hot air to the heating cooking chamber. The first heater is positioned inside the heating cooking chamber and heats the object to be heated. The air sending unit includes a suction hole portion on a predetermined side of the heating cooking chamber and a blow-out hole portion positioned on the predetermined side. The air sending unit suctions air inside the heating cooking chamber through the suction hole portion and blows air out toward the first heater through the blow-out hole portion.

Advantageous Effects of Invention

According to the heating cooking apparatus of the present invention, it is possible to reduce the time taken to heat a predetermined region in a heating cooking chamber by hot air.

DESCRIPTION OF EMBODIMENTS

Figure 1:
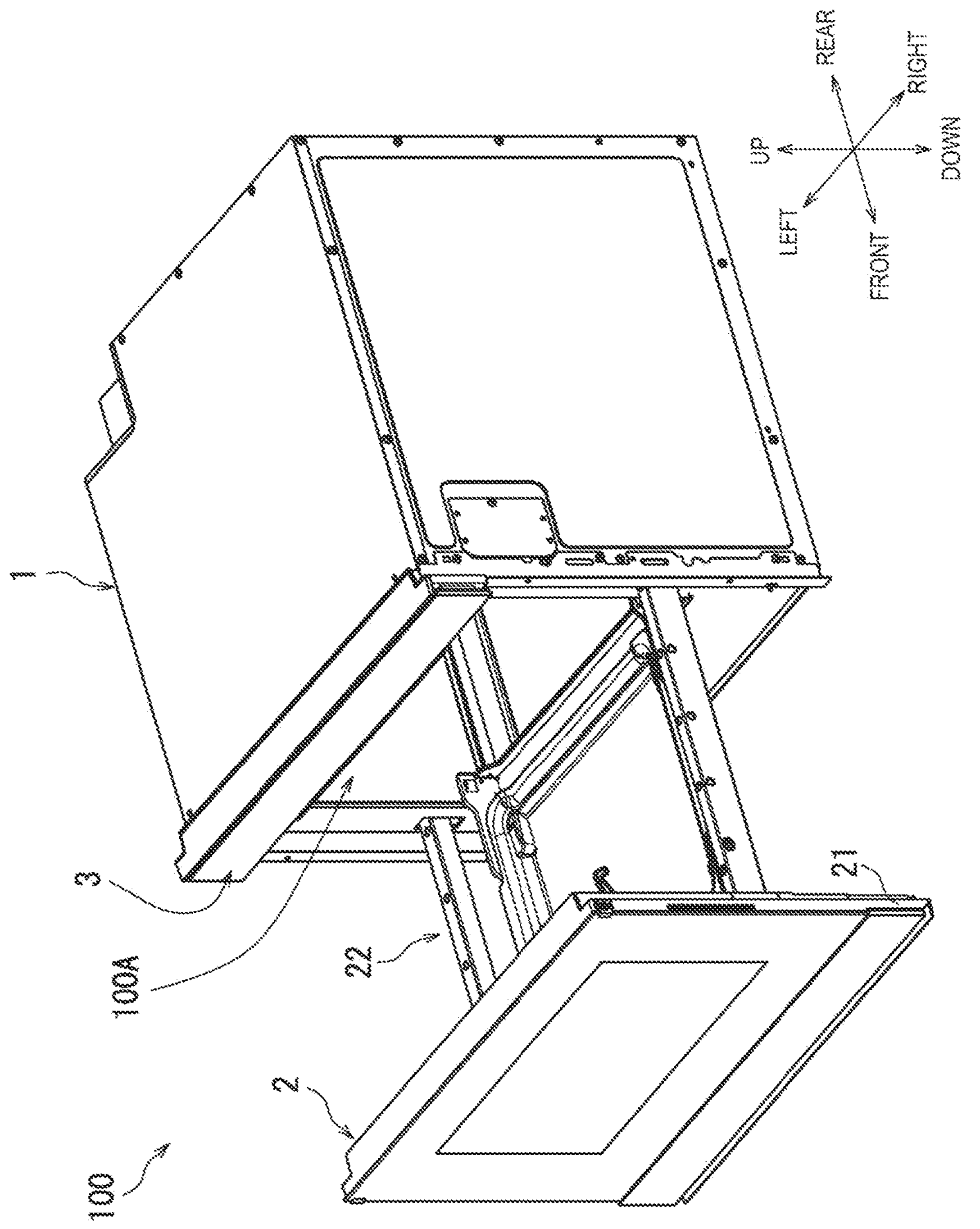
FIG. 1 is a perspective view illustrating an appearance of a pull-out heating cooking apparatus according to a first embodiment of the present invention.

Hereinafter, an embodiment of a pull-out heating cooking apparatus according to the present invention will be described with reference to the drawings. In the drawings, the same or equivalent components are denoted by the same reference signs and description thereof will not be repeated.

First Embodiment

Figure 2:
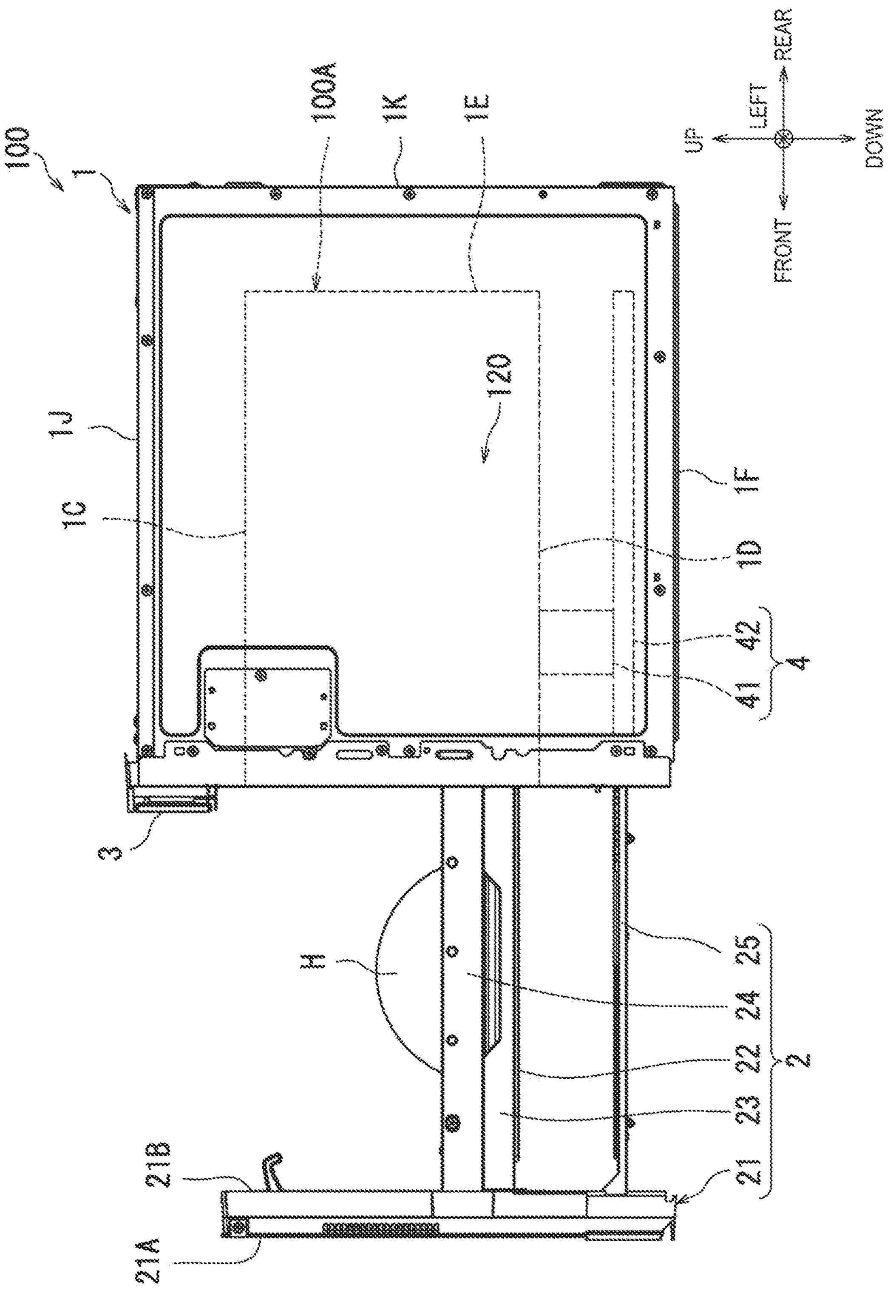
FIG. 2 is a right side view illustrating the pull-out heating cooking apparatus according to the first embodiment.
Figure 3:
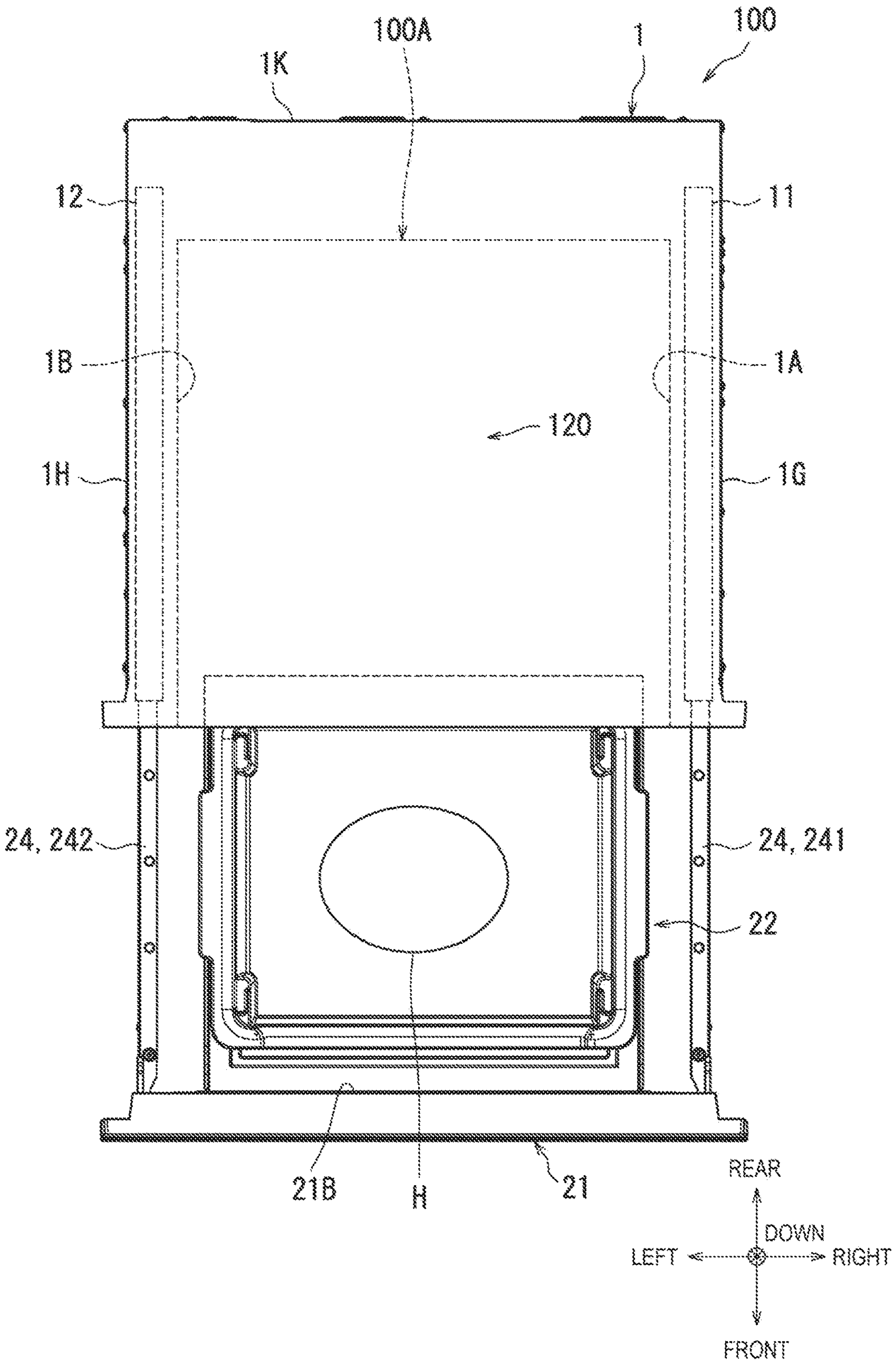
FIG. 3 is a top view illustrating the pull-out heating cooking apparatus according to the first embodiment.

A pull-out heating cooking apparatus 100 according to the first embodiment will be described with reference to FIG. 1 to FIG. 3. FIG. 1 is a perspective view illustrating an appearance of the pull-out heating cooking apparatus 100 according to the first embodiment. FIG. 2 is a right side view illustrating the pull-out heating cooking apparatus 100 according to the first embodiment. FIG. 3 is a top view illustrating the pull-out heating cooking apparatus 100 according to the first embodiment. More specifically, FIG. 1 to FIG. 3 illustrate the pull-out heating cooking apparatus 100 in a state where a pull-out body 2 is pulled out. Further, FIG. 1 illustrates the appearance of the pull-out heating cooking apparatus 100 when viewed from above obliquely from the right. The pull-out heating cooking apparatus 100 is one example of a heating cooking apparatus.

The pull-out heating cooking apparatus 100 heats and cooks an object H to be heated. The object H to be heated is, for example, a food product. As illustrated in FIG. 1, the pull-out heating cooking apparatus 100 includes a heating chamber 1, the pull-out body 2, and an operation panel 3.

In the first embodiment, a side on which the operation panel 3 of the pull-out heating cooking apparatus 100 is disposed is defined as a front side of the pull-out heating cooking apparatus 100, and a side opposite to the front side is defined as a rear side of the pull-out heating cooking apparatus 100. Further, a right side of the pull-out heating cooking apparatus 100 when the pull-out heating cooking apparatus 100 is viewed from the front side is defined as a right side, and a side opposite to the right side is defined as a left side of the pull-out heating cooking apparatus 100. Further, in a direction orthogonal to a front-rear direction and a left-right direction of the pull-out heating cooking apparatus 100, a side on which the operation panel 3 is disposed is defined as an upper side of the pull-out heating cooking apparatus 100, and a side opposite to the upper side is defined as a lower side of the pull-out heating cooking apparatus 100. Note that these orientations do not limit the orientation of the pull-out heating cooking apparatus according to the present invention when in use.

As illustrated in FIG. 1 to FIG. 3, the heating chamber 1 is a box-like member. Specifically, the heating chamber 1 includes a right outer wall 1G, a left outer wall 1H, a top outer wall 1J, a bottom outer wall 1F, and a back outer wall 1K. The heating chamber 1 also includes a heating cooking chamber 100A therein.

The heating cooking chamber 100A includes an accommodation space 120 that accommodates the object H to be heated. The accommodation space 120 is a space that can accommodate the object to be heated H and has a predetermined volume. Specifically, the heating cooking chamber 100A includes a right wall 1A, a left wall 1B, a top wall 1C, a bottom wall 1D, and a back wall 1E. The shape of the heating cooking chamber 100A is, for example, a substantially rectangular parallelepiped shape. Materials of the right wall 1A, the left wall 1B, the top wall 1C, the bottom wall 1D, and the back wall 1E are, for example, a metal. The front side of the heating cooking chamber 100A is opened to allow the object to be heated H to be inserted and removed.

The heating chamber 1 further includes a space between the bottom wall 1D and the bottom outer wall 1F. The heating chamber 1 further includes a space between the right wall 1A and the right outer wall 1G. The heating chamber 1 further includes a space between the left wall 1B and the left outer wall 1H. The heating chamber 1 further includes a space between the top wall 1C and the top outer wall 1J. The heating chamber 1 further includes a space between the back wall 1E and the back outer wall 1K.

The operation panel 3 includes an operation unit and a display portion. The operation unit receives an operation from a user. The operation unit includes various types of keys. The display portion displays various pieces of information. The display portion includes a liquid crystal panel. The operation panel 3 is located on an upper portion of a front face of the heating chamber 1.

The pull-out body 2 is freely pulled out with respect to the heating cooking chamber 100A. Specifically, the pull-out body 2 can be pulled out and pulled in with respect to the heating chamber 1. Specifically, the pull-out body 2 includes a door portion 21, a placing portion 22, and a support portion 23. The door portion 21 can open and close an opening on the front side of the heating cooking chamber 100A. The door portion 21 is a substantially rectangular plate-like member. The door portion 21 includes a front face 21A and a rear face 21B. The door portion 21 opens the opening on the front side of the heating cooking chamber 100A in a state where the pull-out body 2 is pulled out of the heating cooking chamber 100A. The door portion 21 closes the opening on the front side of the heating cooking chamber 100A in a state where the pull-out body 2 is pulled into the heating cooking chamber 100A. Meanwhile, in a state where the pull-out body 2 is pushed into the heating cooking chamber 100A, a distance between the top wall 1C and the bottom wall 1D is shorter than a distance between the back wall 1E and the rear face 21B.

The object H to be heated can be placed on the placing portion 22. The placing portion 22 is, for example, a plate-like member made of ceramic or glass. The support portion 23 is fixed to the rear face 21B of the door portion 21, and supports a peripheral portion of the placing portion 22 such that the placing portion 22 is held in a horizontal state. A material of the support portion 23 includes a metal. The placing portion 22 and the support portion 23 are pulled out of the heating cooking chamber 100A to the outside by pulling out the pull-out body 2. The placing portion 22 and the support portion 23 are accommodated in the heating cooking chamber 100A in a state where the pull-out body 2 is pulled in.

Further, the pull-out body 2 further includes a pair of slide members 24 and a support member 25 in addition to the door portion 21, the support portion 23, and the placing portion 22.

The pair of slide members 24 regulate the movement direction of the pull-out body 2 in the front-rear direction. In other words, the pair of slide members 24 regulate the movement direction of the pull-out body 2 in the front-rear direction. The pair of slide members 24 are fixed to the rear face 21B of the door portion 21.

Specifically, the pair of slide members 24 includes a right slide member 241 and a left slide member 242. Each of the right slide member 241 and the left slide member 242 is a member having the front-rear direction as a longitudinal direction. The right slide member 241 and the left slide member 242 oppose each other in the left-right direction. One end portion of the right slide member 241 is attached to a right edge portion of the rear face 21B of the door portion 21. One end portion of the left slide member 242 is attached to a left edge portion of the rear face 21B of the door portion 21.

Meanwhile, the heating chamber 1 further includes a right slide rail 11 and a left slide rail 12. The right slide rail 11 is fixed in a space between the right wall 1A and the right outer wall 1G. The left slide rail 12 is fixed in a space between the left wall 1B and the left outer wall 1H. Each of the right slide rail 11 and the left slide rail 12 is a member having the front-rear direction as a longitudinal direction. The right slide member 241 is supported to be slidable along the right slide rail 11. The left slide member 242 is supported to be slidable along the left slide rail 12.

Furthermore, the support member 25 supports the door portion 21. More specifically, the support member 25 regulates the movement direction of the pull-out body 2 in the front-rear direction. In other words, the support member 25 regulates the movement direction of the pull-out body 2 in the front-rear direction. One end portion of the support member 25 is attached at a center portion in the left-right direction of the rear face 21B of the door portion 21 and below the placing portion 22. The support member 25 is a member having the front-rear direction as a longitudinal direction. The support member 25 includes a rack portion. The rack portion includes a plurality of teeth.

Meanwhile, the heating chamber 1 further includes a drive mechanism 4. The drive mechanism 4 is accommodated in a space between the bottom wall 1D and the bottom outer wall 1F. For example, the drive mechanism 4 includes a drive motor 41, a pinion, and a drive rail 42. The drive rail 42 is fixed in a space between the bottom wall 1D and the bottom outer wall 1F. The drive rail 42 is a member having the front-rear direction as a longitudinal direction. The support member 25 is supported to be slidable along the drive rail 42. The pinion is attached to a tip end portion of the drive motor 41. The pinion engages with the rack portion of the support member 25. Furthermore, the support member 25 moves in the front-rear direction when the pinion rotates. As the support member 25 moves in the front-rear direction, the pair of slide members 24 also move in the front-rear direction. As a result, the pull-out body 2 is in an open state or a closed state. Note that the drive mechanism 4 may drive at least one of the support member 25, the right slide member 241, and the left slide member 242. Further, in a case where the right slide member 241 and the left slide member 242 are driven, the drive mechanism 4 may be positioned on the side of the heating cooking chamber 100A.

Figure 4:
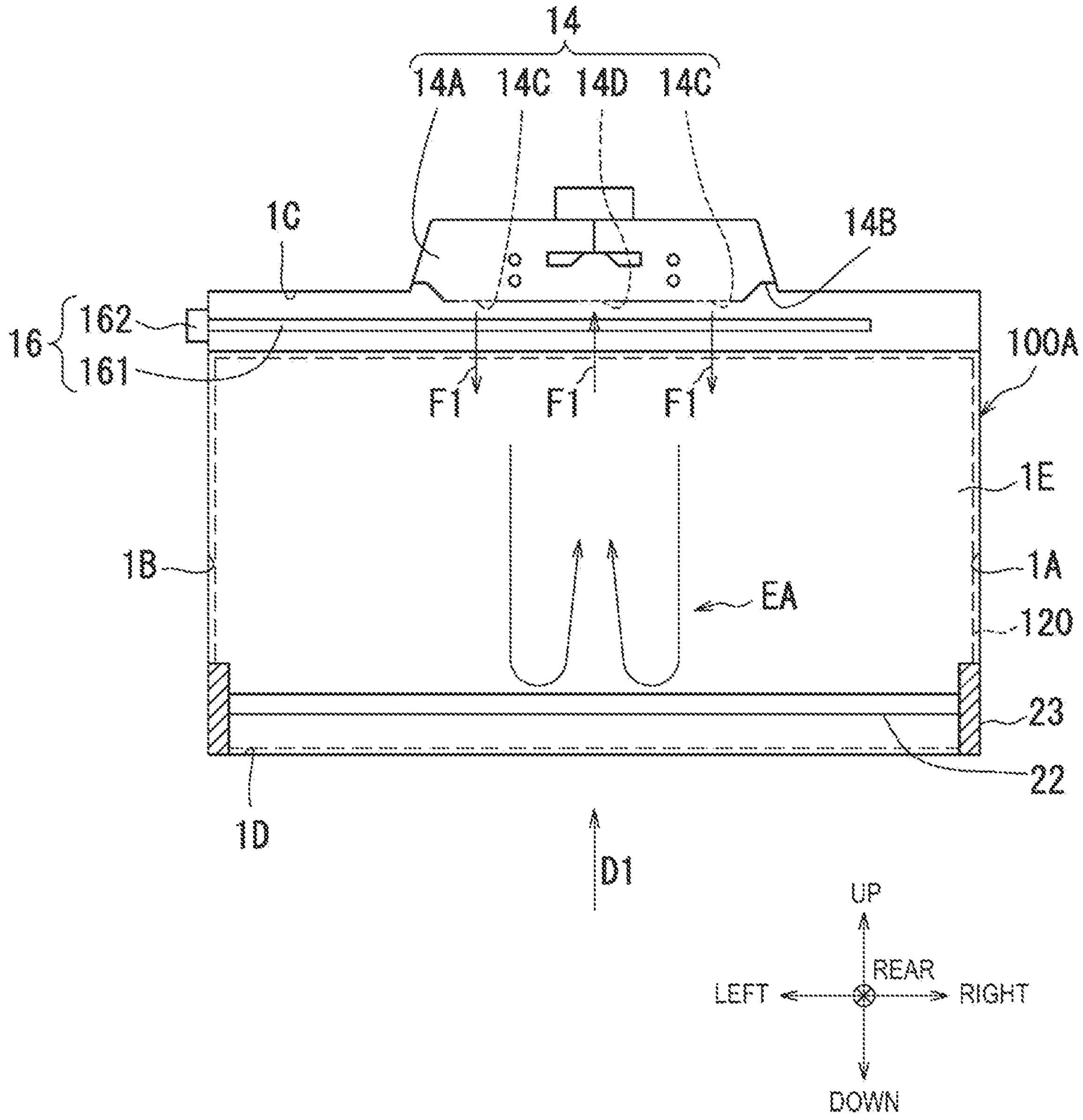
FIG. 4 is a diagram illustrating a schematic cross section of a heating cooking chamber according to the first embodiment.
Figure 5:
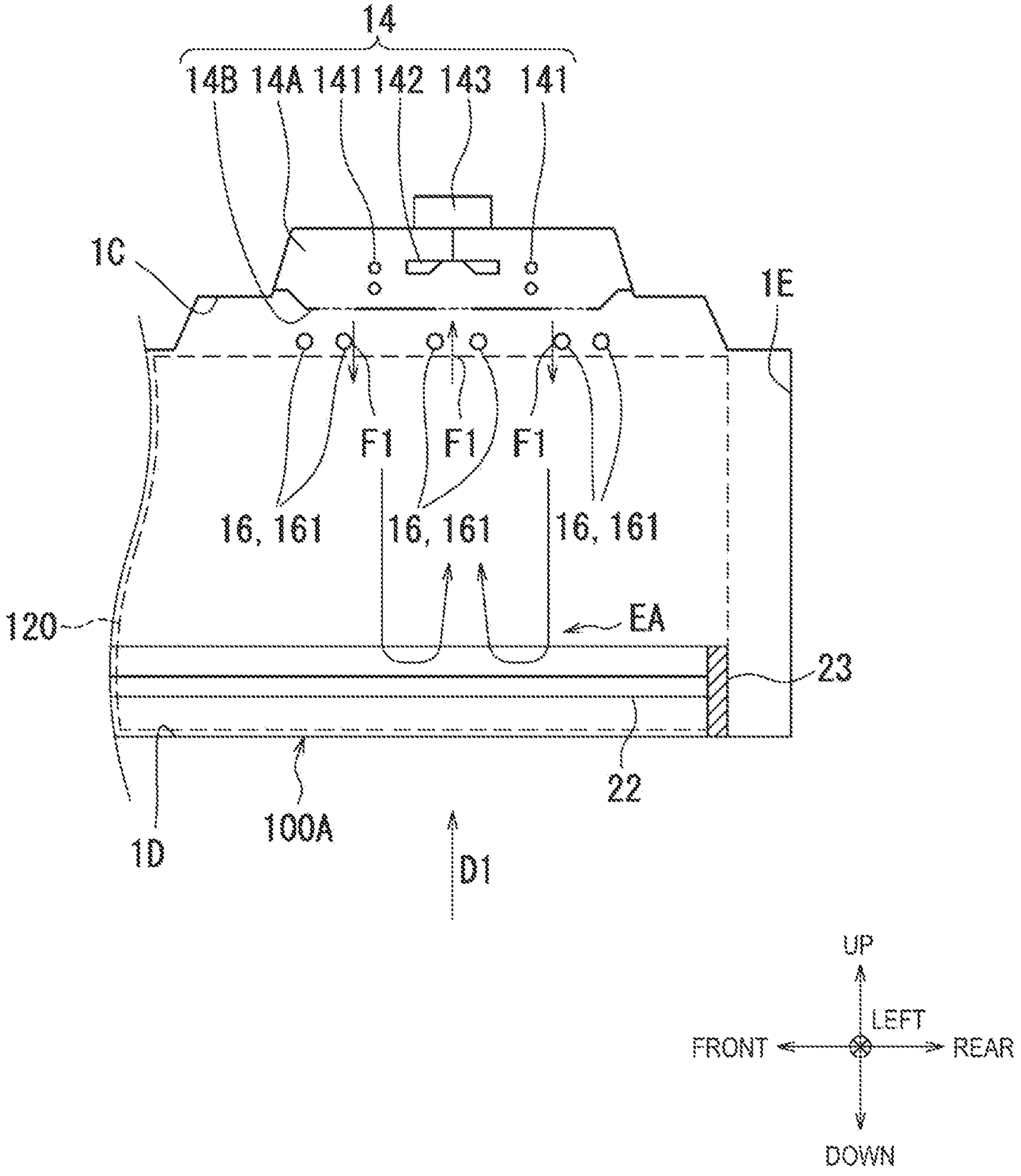
FIG. 5 is a diagram illustrating a schematic cross section of the heating cooking chamber according to the first embodiment.

Next, the heating cooking chamber 100A according to the first embodiment will be further described with reference to FIG. 1 to FIG. 5. FIG. 4 and FIG. 5 are diagrams illustrating a schematic cross section of the heating cooking chamber 100A according to the first embodiment. More specifically, FIG. 4 illustrates a cross section of the heating cooking chamber 100A taken along a plane orthogonal to the front-rear direction. FIG. 5 illustrates a cross section of the heating cooking chamber 100A taken along a plane orthogonal to the left-right direction.

As illustrated in FIG. 4 and FIG. 5, the pull-out heating cooking apparatus 100 further includes an air sending unit 14. The air sending unit 14 supplies a hot air F1 to the heating cooking chamber 100A.

Specifically, the air sending unit 14 includes a suction hole portion 14D and a blow-out hole portion 14C. The suction hole portion 14D is positioned on a predetermined side of the heating cooking chamber 100A. The blow-out hole portion 14C is positioned on a predetermined side of the heating cooking chamber 100A. Specifically, the suction hole portion 14D is positioned in a predetermined direction D1 with respect to an accommodation space 120. The blow-out hole portion 14C is positioned in the predetermined direction D1 with respect to the accommodation space 120. The predetermined direction D1 is, for example, parallel to an upward direction of a vertical direction. More specifically, the air sending unit 14 is positioned above the accommodation space 120 via the top wall 1C. The suction hole portion 14D is positioned above the accommodation space 120. The blow-out hole portion 14C is positioned above the accommodation space 120.

The air sending unit 14 suctions air inside the heating cooking chamber 100A through the suction hole portion 14D and blows air into the heating cooking chamber 100A through the blow-out hole portion 14C. More specifically, the air sending unit 14 suctions the hot air F1 from a predetermined region EA in the accommodation space 120 and blows the hot air F1 into the predetermined region EA within the accommodation space 120. The predetermined region EA is, for example, a center region within the accommodation space 120. A center portion of the object H to be heated is disposed in the predetermined region EA.

According to the pull-out heating cooking apparatus 100, because the suction hole portion 14D and the blow-out hole portion 14C are positioned on a predetermined side of the heating cooking chamber 100A, a distance between the suction hole portion 14D and the blow-out hole portion 14C is reduced. As a result, the circulation path of the hot air F1 is also reduced. Thus, it is possible to reduce the time taken to heat the predetermined region EA within the heating cooking chamber 100A by the hot air F1.

Further, the suction hole portion 14D and the blow-out hole portion 14C are positioned above the accommodation space 120. Since a distance between the top wall 1C and the bottom wall 1D is short, a distance between the suction hole portion 14D and the predetermined region EA and a distance between the blow-out hole portion 14C and the predetermined region EA are reduced. Thus, the predetermined region EA within the heating cooking chamber 100A can be heated in a shorter period of time. Further, an upper face of the placing portion 22 of the pull-out body 2 can be heated in a shorter period of time.

Figure 6A:
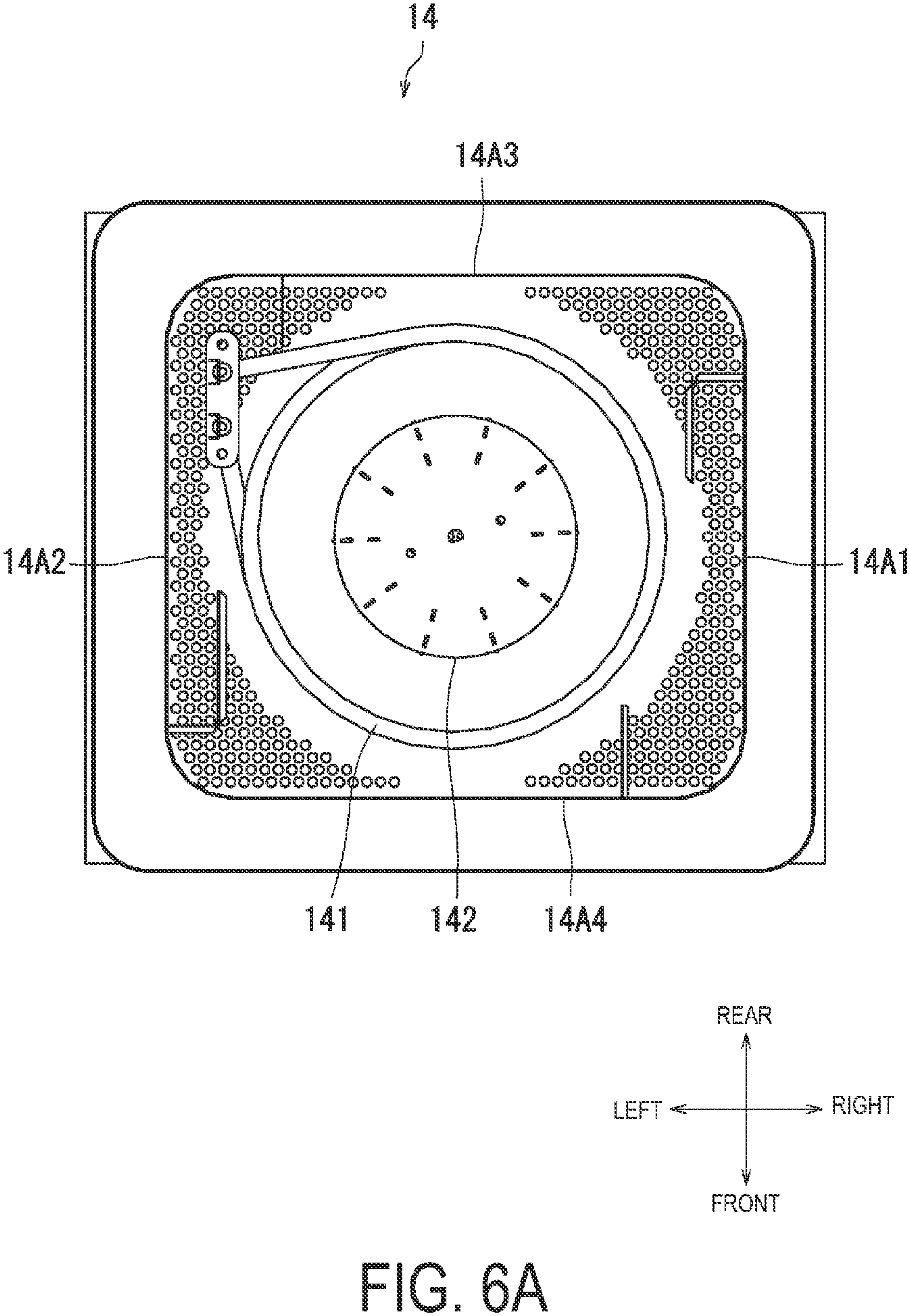
FIG. 6A is a diagram illustrating a schematic cross section of an air sending unit according to the first embodiment.

Here, the air sending unit 14 will be described in detail with reference to FIG. 4 to FIG. 6A. FIG. 6A is a diagram illustrating a schematic cross section of the air sending unit 14. As illustrated in FIG. 4 to FIG. 6A, the air sending unit 14 further includes a heating chamber 14A, a second heater 141, a centrifugal fan 142, a drive unit 143, and a partitioning member 14B. The heating chamber 14A is, for example, a box-like member. Specifically, the heating chamber 14A includes a right wall 14A1, a left wall 14A2, a rear wall 14A3, and a front wall 14A4.

The second heater 141 and the centrifugal fan 142 are accommodated in the heating chamber 14A. The second heater 141 generates the hot air F1 by heating air inside the heating chamber 14A. Specifically, the shape of the second heater 141 is a circular ring when viewed downward from above. Further, the second heater 141 is disposed along the outer circumference of the centrifugal fan 142.

The drive unit 143 is positioned outside of the heating chamber 14A. The drive unit 143 energizes the second heater 141 and drives the centrifugal fan 142. The drive unit 143 includes, for example, a motor and an energization unit.

Figure 6B:
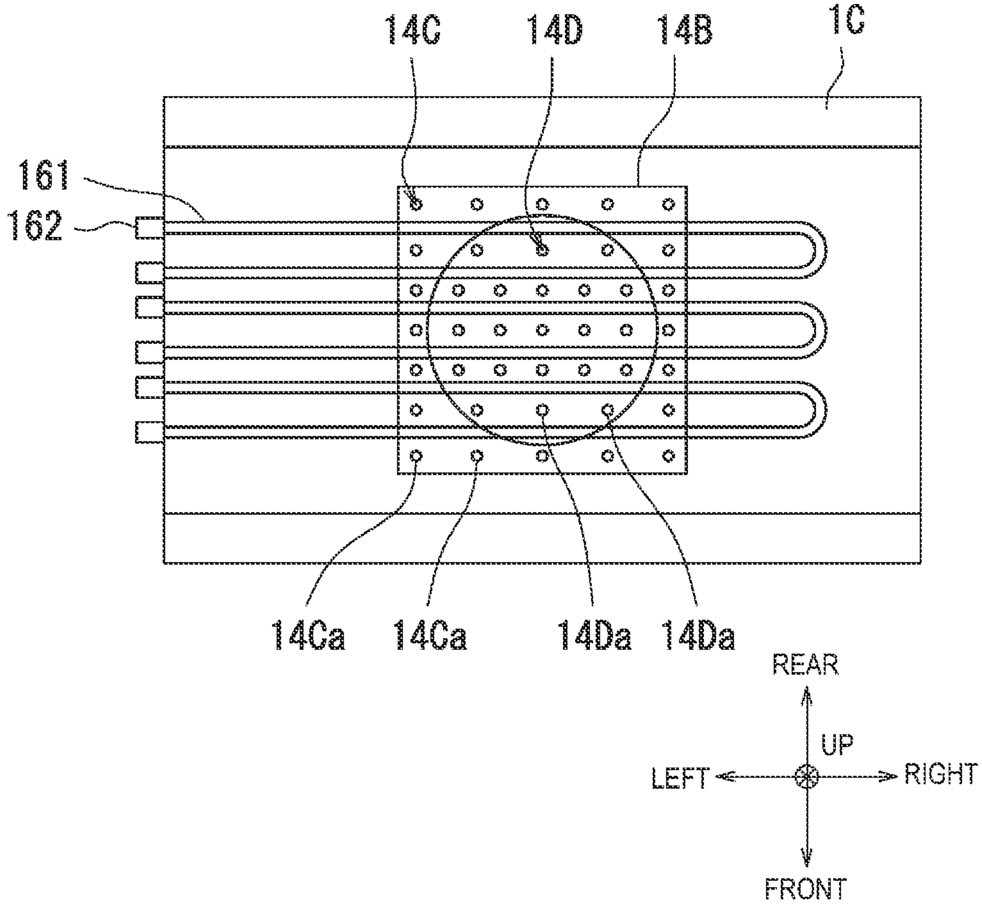
FIG. 6B is a diagram illustrating a partitioning member according to the first embodiment.

Next, the air sending unit 14 according to the first embodiment will be further described with reference to FIG. 1 to FIG. 6B. FIG. 6B is a diagram illustrating the partitioning member 14B according to the first embodiment.

As illustrated in FIG. 6B, the partitioning member 14B is positioned above the accommodation space 120. Specifically, the partitioning member 14B is positioned between the heating chamber 14A and the heating cooking chamber 100A. The partitioning member 14B is, for example, a plate-like member made of a metal. The shape of the partitioning member 14B is, for example, a square shape when viewed upward from below. The partitioning member 14B is disposed in a substantially center portion of the top wall 1C. The suction hole portion 14D and the blow-out hole portion 14C are disposed in the partitioning member 14B. Thus, the suction hole portion 14D and the blow-out hole portion 14C can be easily disposed above the accommodation space 120.

More specifically, the suction hole portion 14D is, for example, a set of a plurality of punched holes 14Da. Similarly, the blow-out hole portion 14C is also, for example, a set of a plurality of punched holes 14Ca. The punched holes 14Da are an example of suction holes. The punched holes 14Ca are an example of blow-out holes. Each of the punched holes 14Da and the punched holes 14Ca is, for example, circular. The diameter of each of the punched holes 14Da and the punched holes 14Ca is, for example, 3.4 mm. The size of each of the punched holes 14Da and the punched holes 14Ca is small. As a result, it is possible to prevent a tool or the like from being caught in each of the suction hole portion 14D and the blow-out hole portion 14C when the heating cooking chamber 100A is cleaned.

In more detail, the blow-out hole portion 14C surrounds the suction hole portion 14D. Specifically, the suction hole portion 14D is positioned at the center portion of the partitioning member 14B. The set of the plurality of punched holes 14Da of the suction hole portion 14D has, for example, a circular shape. On the other hand, the blow-out hole portion 14C is formed along the outer circumference of the suction hole portion 14D. The set of the plurality of punched holes 14Ca of the blow-out hole portion 14C has, for example, an annular shape.

The centrifugal fan 142 opposes the heating cooking chamber 100A via the partitioning member 14B. The suction hole portion 14D opposes the centrifugal fan 142.

Here, a flow of the hot air F1 will be described in detail. First, the air sending unit 14 suctions the hot air F1 in the heating cooking chamber 100A into the heating chamber 14A through the suction hole portion 14D with the centrifugal fan 142. The hot air F1 suctioned into the heating chamber 14A is heated by the second heater 141. The air sending unit 14 blows the hot air F1 in the heating chamber 14A out into the heating cooking chamber 100A through the blow-out hole portion 14C with the centrifugal fan 142. The hot air F1 blown out into the heating cooking chamber 100A moves downward. Thereafter, the hot air F1 that has reached the peripheral region of the predetermined region EA in the heating cooking chamber 100A moves, for example, toward the center region of the predetermined region EA and moves upward so that the movement direction of the hot air F1 is reversed. The hot air F1 moving upward moves within the heating cooking chamber 100A. Thereafter, the hot air F1 is suctioned into the heating chamber 14A again from the suction hole portion 14D. In this manner, the air sending unit 14 circulates the hot air F1 between the heating chamber 14A and the predetermined region EA in the heating cooking chamber 100A.

Thus, according to the pull-out heating cooking apparatus 100 of the present invention, the blow-out hole portion 14C surrounds the suction hole portion 14D, and thus it is possible to more uniformly heat the predetermined region EA in the heating cooking chamber 100A. Further, the upper face of the placing portion 22 of the pull-out body 2 can be more uniformly heated.

As illustrated in FIG. 4 to FIG. 6B, the pull-out heating cooking apparatus 100 further includes a grill unit 16. Specifically, the grill unit 16 includes a first heater 161 and an energization unit 162. The first heater 161 is positioned in the heating cooking chamber 100A and heats the object H to be heated. More specifically, the first heater 161 is positioned at an upper portion in the heating cooking chamber 100A. The first heater 161 has a substantially U shape when viewed upward from below. In the first embodiment, three grill units 16 are disposed. The first heater 161 is, for example, a sheathed heater. It is preferable that the position of the blow-out hole portion 14C and the position of the first heater 161 overlap each other in the predetermined direction D1. Specifically, when viewed upward from below, the position of the blow-out hole portion 14C overlaps the position of the first heater 161. The energization unit 162 is positioned outside of the left wall 1B. The energization unit 162 energizes the first heater 161. The energized first heater 161 generates heat.

Again, flow of the hot air F1 will be described again in detail. First, the air sending unit 14 suctions the hot air F1 in the heating cooking chamber 100A into the heating chamber 14A through the suction hole portion 14D with the centrifugal fan 142. The hot air F1 suctioned into the heating chamber 14A is heated by the second heater 141. The air sending unit 14 blows the hot air F1 in the heating chamber 14A into the heating cooking chamber 100A through the blow-out hole portion 14C with the centrifugal fan 142. The hot air F1 blown into the heating cooking chamber 100A moves downward. The hot air F1 moving within the heating cooking chamber 100A is heated by the first heater 161. Thereafter, the hot air F1 reaches the predetermined region EA in the heating cooking chamber 100A.

According to the pull-out heating cooking apparatus 100 of the present invention, because the first heater 161 is provided, the hot air F1 is heated not only by the second heater 141 but also by the first heater 161. As a result, the predetermined region EA in the heating cooking chamber 100A can be heated in a shorter period of time. Further, the upper face of the placing portion 22 of the pull-out body 2 can be heated in a shorter period of time.

Figure 7:
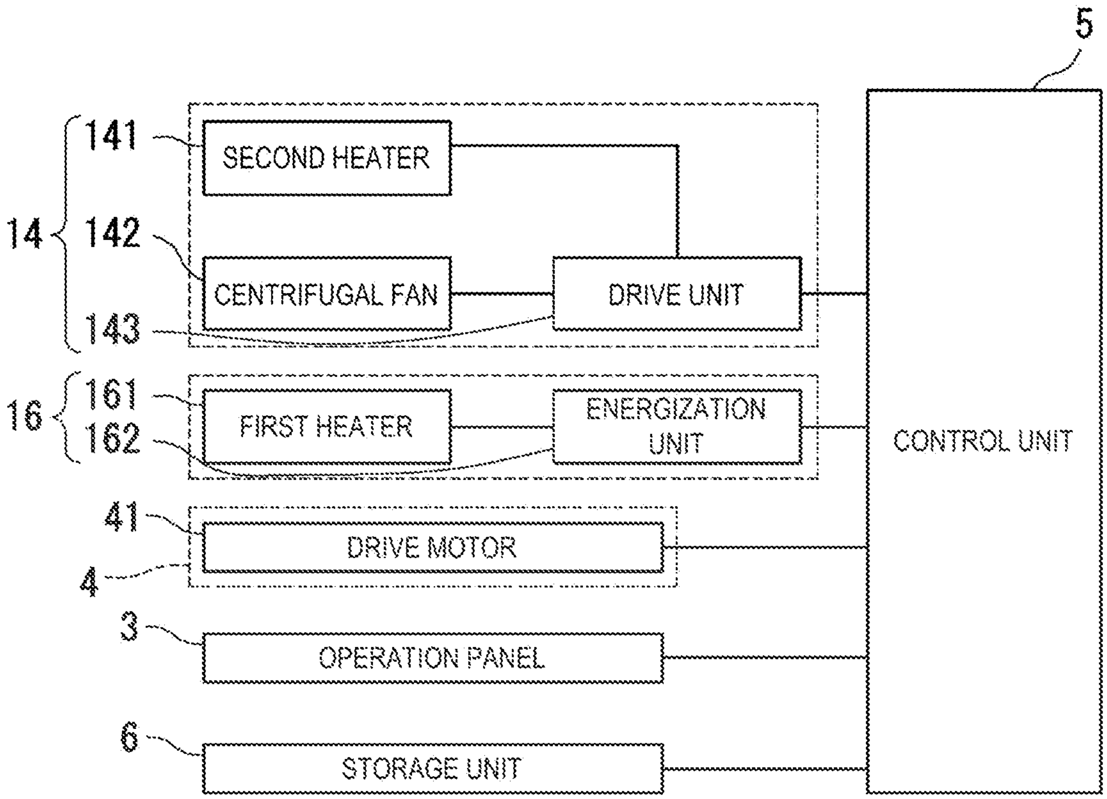
FIG. 7 is a block diagram illustrating a configuration of the pull-out heating cooking apparatus according to the first embodiment.

A configuration of the pull-out heating cooking apparatus 100 will be described in detail with reference to FIG. 7. FIG. 7 is a block diagram illustrating a configuration of the pull-out heating cooking apparatus 100 according to the first embodiment. As illustrated in FIG. 7, the pull-out heating cooking apparatus 100 further includes a control unit 5 and a storage unit 6.

In the first embodiment, the pull-out heating cooking apparatus 100 has a “first hot air circulation heating mode,” a “second hot air circulation heating mode,” and a “grill heating mode” as heating cooking modes. The “first hot air circulation heating mode” is a mode in which an object H to be heated is heated and cooked by directly blowing the hot air F1 onto an upper face of the object H to be heated. The “second hot air circulation heating mode” is a mode in which the predetermined region EA in the heating cooking chamber 100A is preheated in a short period of time by circulating the hot air F1 in the heating cooking chamber 100A. The “grill heating mode” is mainly a mode in which the object H to be heated is heated and cooked by conducting heat generated by the first heater 161 to the object H to be heated.

The control unit 5 is a hardware circuit that includes a processor such as a central processing unit (CPU). The control unit 5 controls the second heater 141, the drive unit 143, the energization unit 162, the drive motor 41, the operation panel 3, and the storage unit 6 by executing control programs stored in the storage unit 6.

The storage unit 6 includes a random access memory (RAM) and a read only memory (ROM). The storage unit 6 stores control programs used for controlling operations of each part of the pull-out heating cooking apparatus 100. The storage unit 6 stores setting information input when the operation panel 3 is operated.

Figure 8:
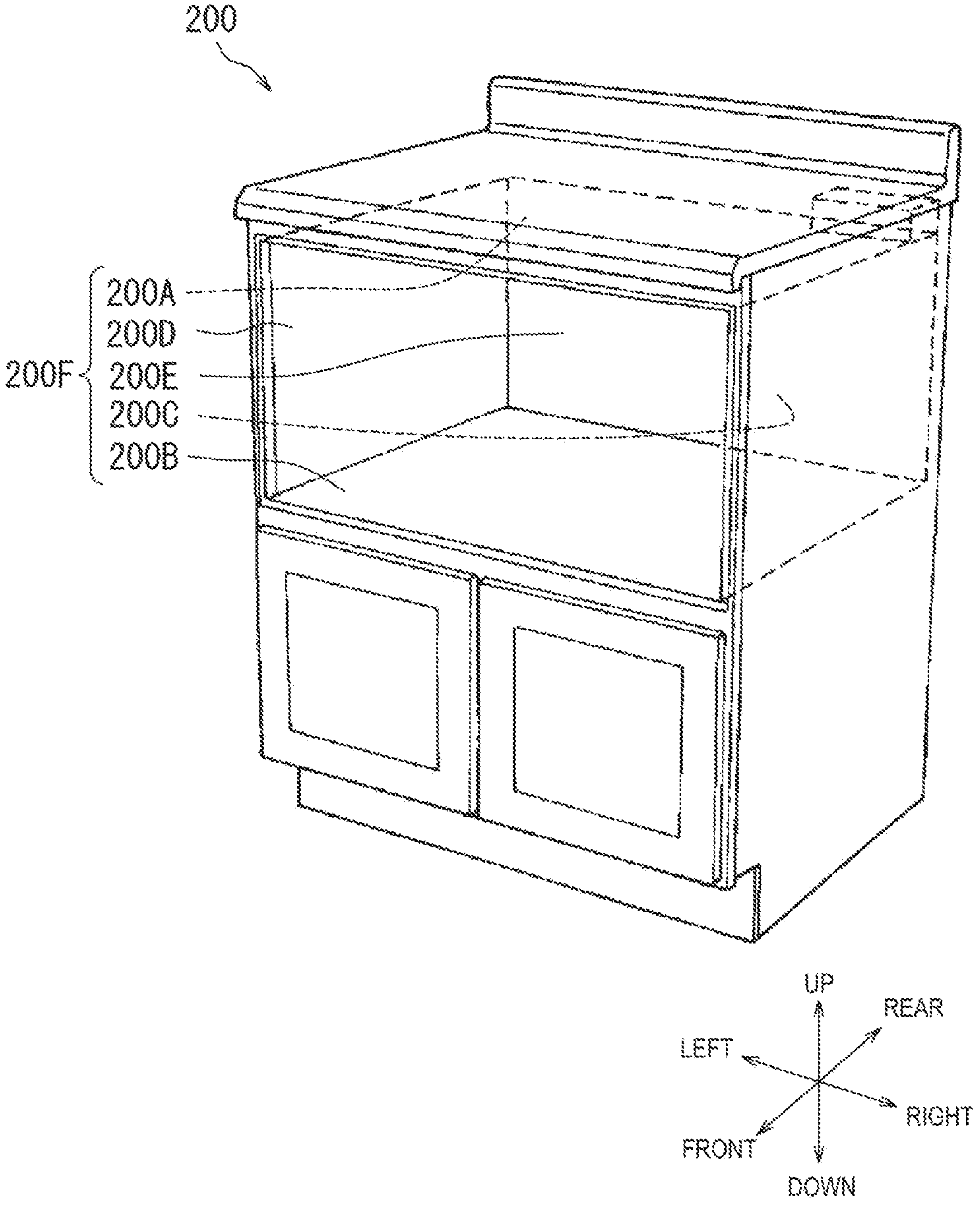
FIG. 8 is a perspective view illustrating an appearance of a cabinet to which the pull-out heating cooking apparatus according to the first embodiment is attached.

Next, a cabinet 200 to which the pull-out heating cooking apparatus 100 is attached will be described with reference to FIG. 8. FIG. 8 is a diagram illustrating an appearance of the cabinet 200 to which the pull-out heating cooking apparatus 100 according to the present embodiment is attached.

The pull-out heating cooking apparatus 100 is installed in the cabinet 200 in built-in manner. As illustrated in FIG. 8, the cabinet 200 includes an upper wall 200A, a lower wall 200B, a right wall 200C, a left wall 200D, and a rear wall 200E. The upper wall 200A, the lower wall 200B, the right wall 200C, the left wall 200D, and the rear wall 200E form an accommodation portion 200F. The accommodation portion 200F is a rectangular parallelepiped space in which the pull-out heating cooking apparatus 100 is attached.

Here, a control method by which the control unit 5 controls the air sending unit 14 will be described in detail with reference to FIG. 9 and FIG. 10. More specifically, the control unit 5 controls the rotation speed of the centrifugal fan 142. Specifically, the control unit 5 controls the drive unit 143 to increase or reduce the rotation speed of the centrifugal fan 142.

Figure 9:
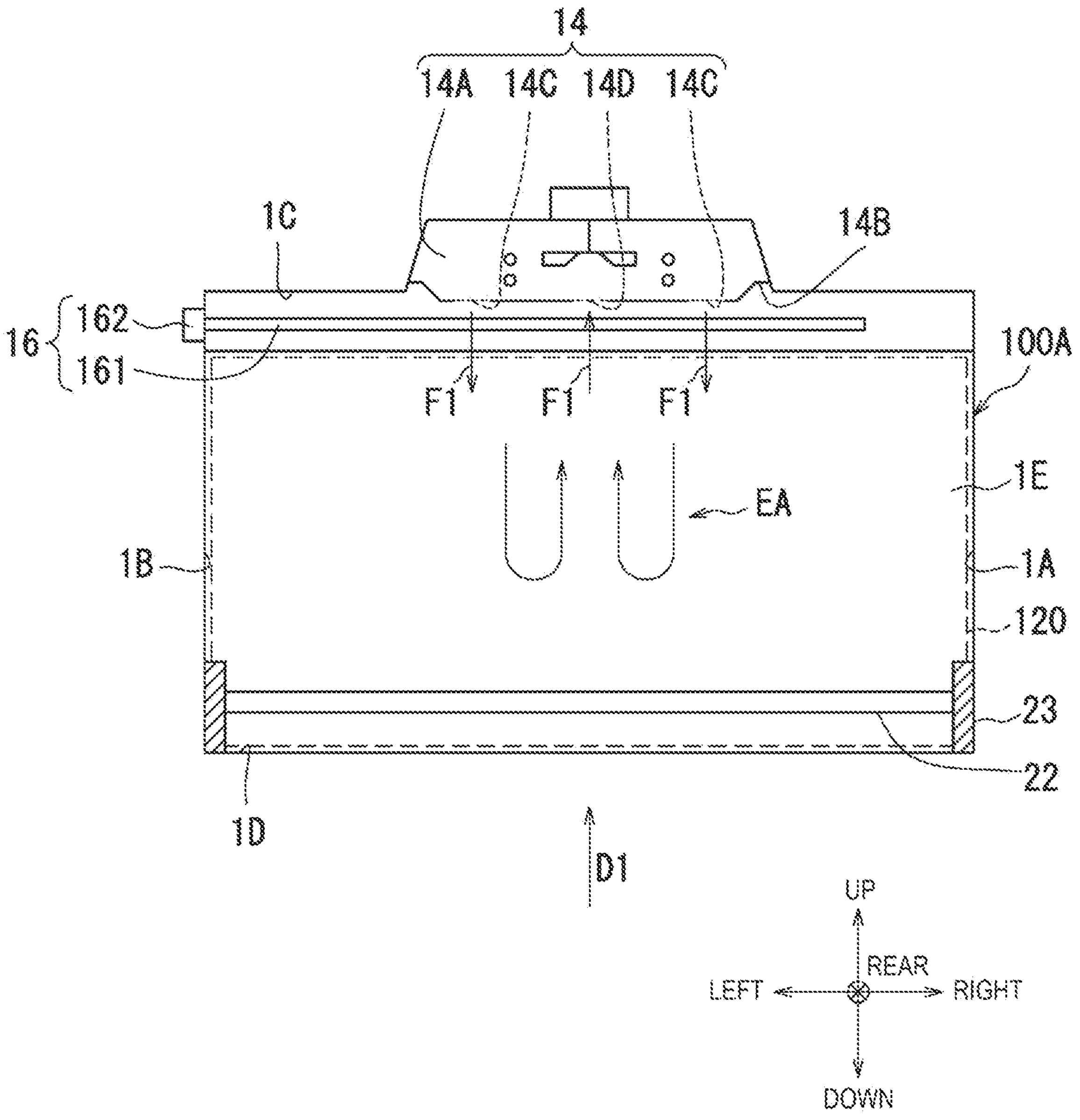
FIG. 9 is a diagram illustrating a cross section of the heating cooking chamber taken along a plane orthogonal to a front-rear direction in the pull-out heating cooking apparatus according to the first embodiment.

FIG. 9 is a diagram illustrating a cross section of the heating cooking chamber 100A taken along a plane orthogonal to a front-rear direction. As illustrated in FIG. 9, the drive unit 143 drives the centrifugal fan 142 so that the rotation speed of the centrifugal fan 142 becomes lower than the rotation speed of the centrifugal fan 142 illustrated in FIG. 4. As a result, a blow distance of the hot air F1 changes. The blow distance refers to, for example, a distance at which the hot air F1 reaches a position farthest from the partitioning member 14B.

As described above, according to the pull-out heating cooking apparatus 100, the rotation speed of the centrifugal fan 142 is controlled, and thus it is possible to reduce heating unevenness regardless of differences in the heights of objects H to be heated.

In addition, the control unit 5 controls the rotation direction of the centrifugal fan 142. More specifically, the control unit 5 controls the drive unit 143 to set the rotation direction of the centrifugal fan 142 to a clockwise direction R1 or a counterclockwise direction R2.

Figure 10A:
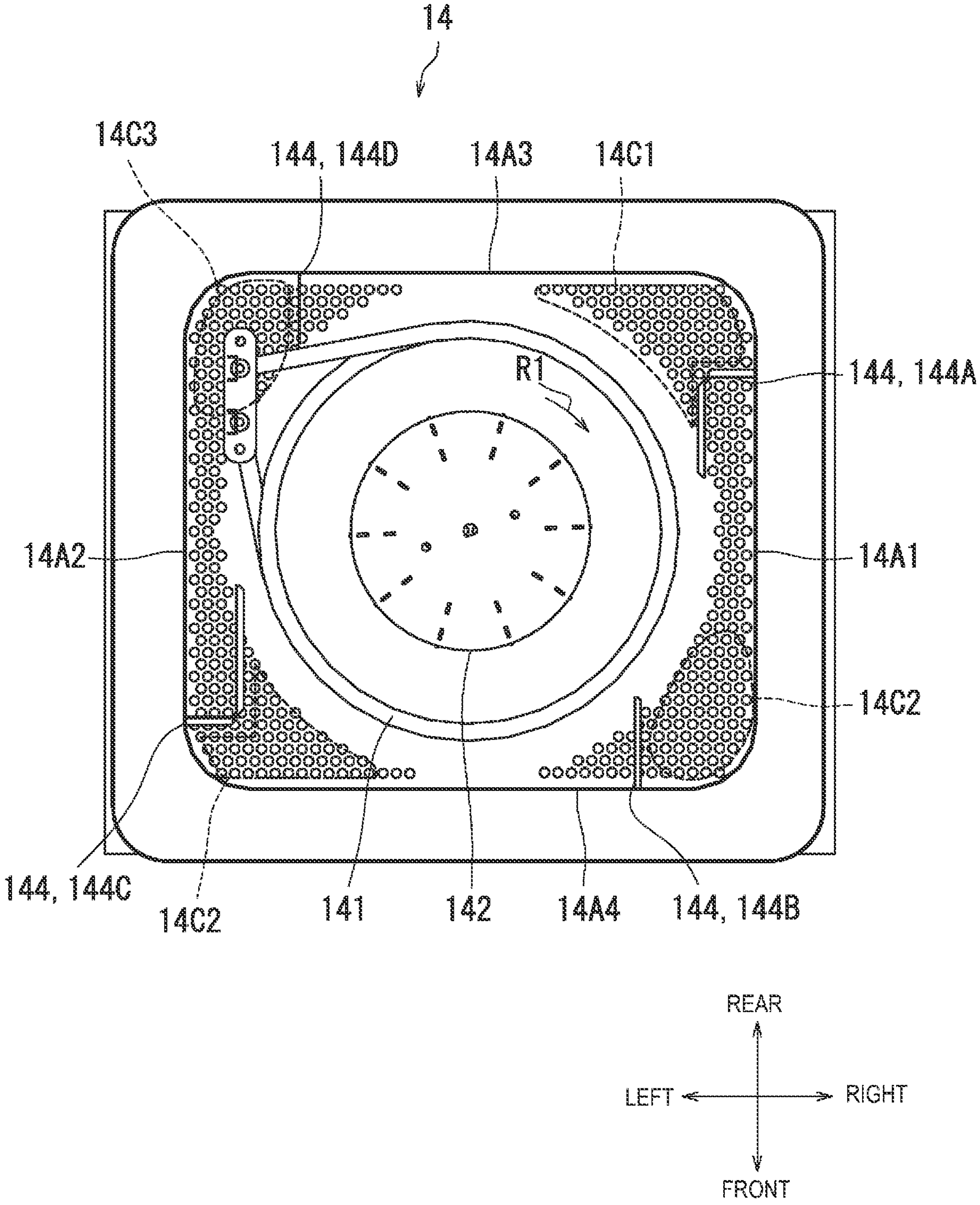
FIG. 10A is a diagram illustrating a schematic cross section of the air sending unit according to the first embodiment.
Figure 10B:
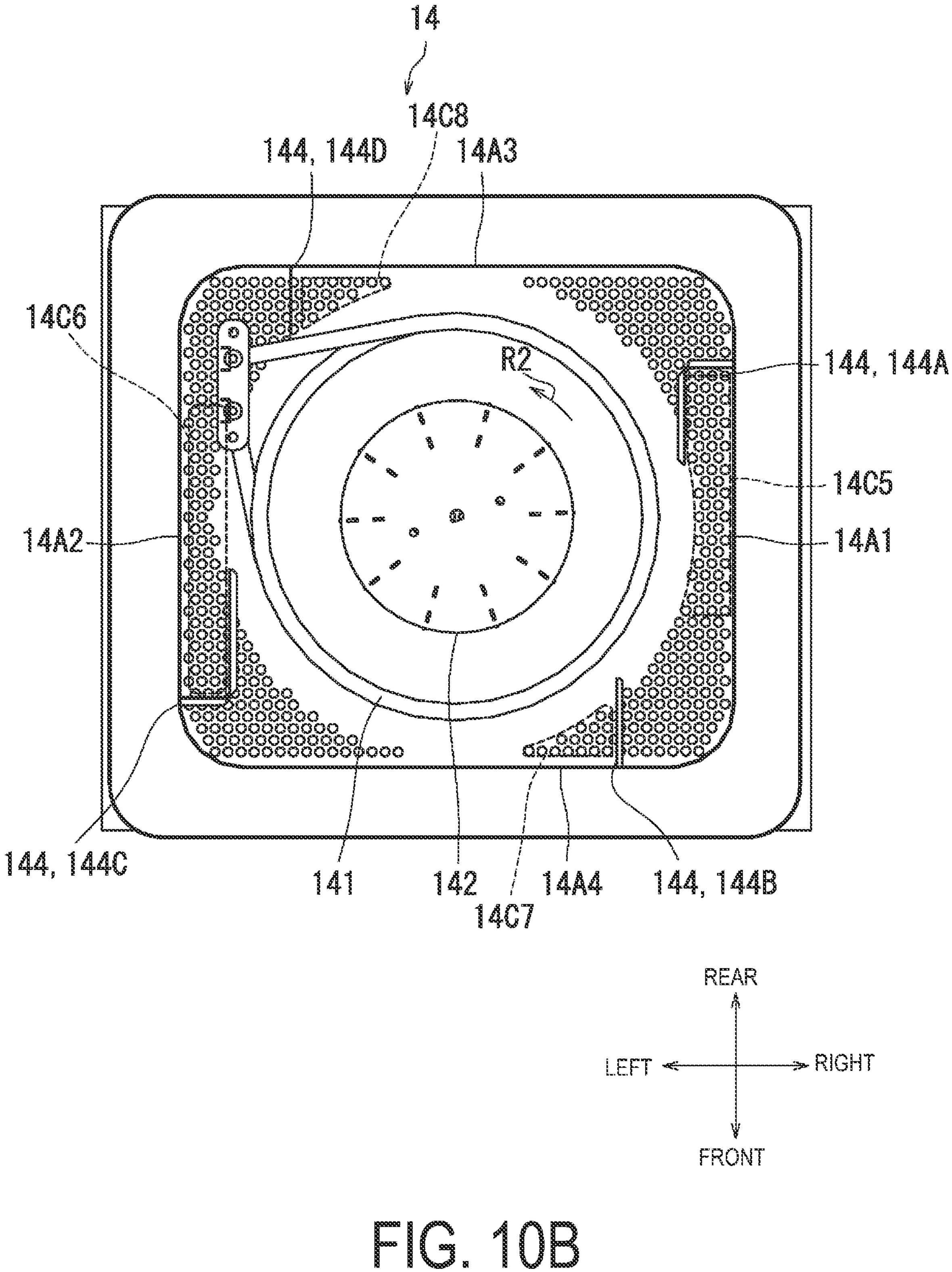
FIG. 10B is a diagram illustrating a schematic cross section of the air sending unit according to the first embodiment.

The air sending unit 14 will be described in detail with reference to FIG. 10A and FIG. 10B. As illustrated in FIG. 10A and FIG. 10B, the air sending unit 14 further includes a plurality of partitioning plates 144. Each of the plurality of partitioning plates 144 is erected from an upper face of the partitioning member 14B.

Specifically, the plurality of partitioning plates 144 includes a first partitioning plate 144A, a second partitioning plate 144B, a third partitioning plate 144C, and a fourth partitioning plate 144D. The first partitioning plate 144A is positioned in a rear right region of the first partitioning plate 144A. The second partitioning plate 144B is positioned in a front right region of the first partitioning plate 144A. The third partitioning plate 144C is positioned in a front left region of the first partitioning plate 144A. The fourth partitioning plate 144D is positioned in a rear left region of the first partitioning plate 144A.

More specifically, the first partitioning plate 144A includes a first plate and a second plate. The first plate is disposed in parallel with the rear wall 14A3 with a predetermined space from the rear wall 14A3. In addition, a right end portion of the first plate is connected to the right wall 14A1. The second plate is disposed in parallel with the right wall 14A1 with a predetermined space from the right wall 14A1. In addition, a left end portion of the first plate and a rear end portion of the second plate are connected to each other. In other words, the shape of the first partitioning plate 144A is substantially an L shape when viewed downward from above.

Further, the second partitioning plate 144B is disposed in parallel with the right wall 14A1 with a predetermined space from the right wall 14A1. In addition, a front end portion of the second partitioning plate 144B is connected to the front wall 14A4.

In addition, the third partitioning plate 144C has a first plate and a second plate. The first plate is disposed in parallel with the front wall 14A4 with a predetermined space from the front wall 14A4. The left end portion of the first plate is connected to the left wall 14A2. The second plate is disposed in parallel with the left wall 14A2 with a predetermined space from the left wall 14A2. In addition, a right end portion of the first plate and a front end portion of the second plate are connected to each other. In other words, the shape of the third partitioning plate 144C is substantially an L shape when viewed downward from above.

Further, the fourth partitioning plate 144D is disposed in parallel with the left wall 14A2 with a predetermined space from the left wall 14A2. A rear end of the fourth partitioning plate 144D is connected to the rear wall 14A3.

As illustrated in FIG. 10A, the control unit 5 controls the drive unit 143 to set the rotation direction of the centrifugal fan 142 to the clockwise direction R1. The air sending unit 14 suctions the hot air F1 in the heating cooking chamber 100A into the heating chamber 14A through the suction hole portion 14D with the centrifugal fan 142. The hot air F1 suctioned into the heating chamber 14A is heated by the second heater 141.

The air sending unit 14 blows the hot air F1 in the heating chamber 14A into the heating cooking chamber 100A through the blow-out hole portion 14C with the centrifugal fan 142. More specifically, the hot air F1 is blown into the heating cooking chamber 100A from four corners of the partitioning member 14B. Specifically, the hot air F1 is blown into the heating cooking chamber 100A from the plurality of punched holes 14Ca positioned in the first region 14C1, the second region 14C2, the third region 14C3, and the fourth region 14C4. The first region 14C1, the second region 14C2, the third region 14C3, and the fourth region 14C4 are positioned on sides in directions opposite to the clockwise directions R1 of the first partitioning plate 144A, the second partitioning plate 144B, the third partitioning plate 144C, and the fourth partitioning plate 144D.

On the other hand, as illustrated in FIG. 10B, the control unit 5 controls the drive unit 143 to set the rotation direction of the centrifugal fan 142 to the counterclockwise direction R2. The air sending unit 14 suctions the hot air F1 in the heating cooking chamber 100A into the heating chamber 14A through the suction hole portion 14D with the centrifugal fan 142. The hot air F1 suctioned into the heating chamber 14A is heated by the second heater 141.

The air sending unit 14 blows the hot air F1 in the heating chamber 14A into the heating cooking chamber 100A through the blow-out hole portion 14C with the centrifugal fan 142. More specifically, the hot air F1 is blown into the heating cooking chamber 100A mainly from the right region and the left region of the partitioning member 14B. Specifically, the hot air F1 is blown into the heating cooking chamber 100A from the plurality of punched holes 14Ca positioned in a fifth region 14C5, a sixth region 14C6, a seventh region 14C7, and an eighth region 14C8. The fifth region 14C5 and the sixth region 14C6 are surrounded by the first partitioning plate 144A and the third partitioning plate 144C, respectively.

As described above, according to the pull-out heating cooking apparatus 100, the rotation direction of the centrifugal fan 142 is controlled. As a result, the blow-out direction and the blow-out region of the hot air F1 can be changed, and thus it is possible to reduce localized heating of the object H to be heated and reduce heating unevenness of the object H to be heated.

Figure 11:
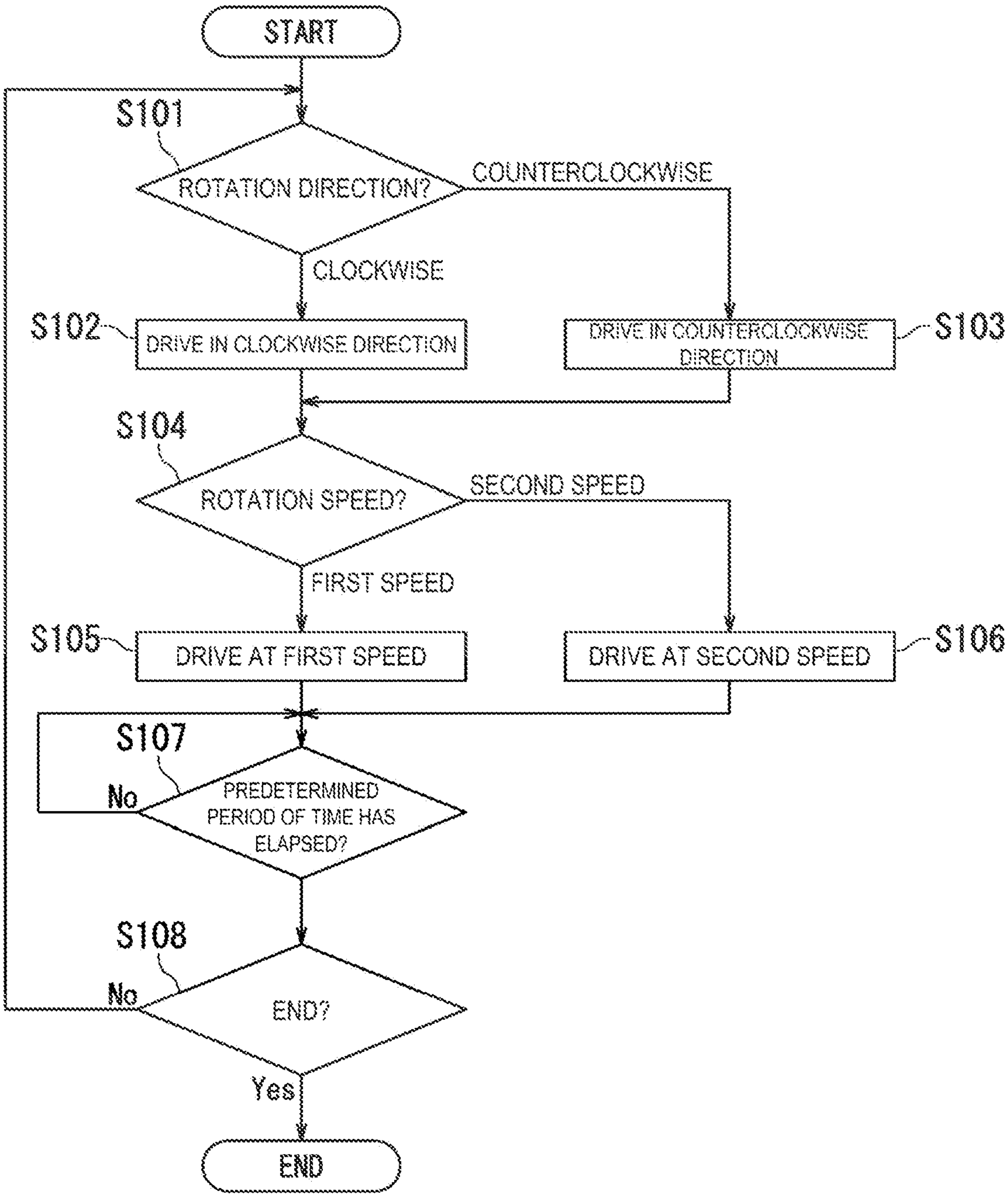
FIG. 11 illustrates an example of processing of a control unit according to the first embodiment.

Next, an example of processing of the control unit 5 according to the first embodiment will be described with reference to FIG. 11. FIG. 11 is a flowchart illustrating an example of processing of the control unit 5. As illustrated in FIG. 11, the processing of the control unit 5 includes steps S101 to S108. For example, the control unit 5 controls the air sending unit 14 on the basis of the "first hot air circulation heating mode" input via the operation panel 3 and information on the object H to be heated. A method of controlling the air sending unit 14 is stored in the storage unit 6 in advance. More specifically, in the control method, information on the object H to be heated, the rotation direction of the air sending unit 14, the rotation speed of the air sending unit 14, and a predetermined period of time are associated with each other.

First, in step S101, the control unit 5 determines the rotation direction of the centrifugal fan 142. In a case where the control unit 5 determines that the rotation direction is the clockwise direction R1, the processing proceeds to step S102. On the other hand, in a case where the control unit 5 determines that the rotation direction is the counterclockwise direction R2, the processing proceeds to step S103.

In step S102, the drive unit 143 drives the centrifugal fan 142 in the clockwise direction R1. Then, the processing proceeds to step S104.

On the other hand, in step S103, the drive unit 143 drives the centrifugal fan 142 in the counterclockwise direction R2. Then, the processing proceeds to step S104.

In step S104, the control unit 5 determines the rotation speed of the centrifugal fan 142. In a case where the control unit 5 determines that the rotation speed is a first speed, the processing proceeds to step S105. On the other hand, in a case where the control unit 5 determines that the rotation speed is a second speed, the processing proceeds to step S106. The second speed is lower than the first speed.

In step S105, the drive unit 143 drives the centrifugal fan 142 at the first speed. Then, the processing proceeds to step S107.

On the other hand, in step S106, the drive unit 143 drives the centrifugal fan 142 at the second speed. Then, the processing proceeds to step S107.

In step S107, the control unit 5 determines whether or not a predetermined period of time has elapsed. In a case where the control unit 5 determines that a predetermined period of time has not elapsed, the processing returns to step S107. On the other hand, in a case where the control unit 5 determines that a predetermined period of time has elapsed, the processing proceeds to step S108.

In step S108, the control unit 5 determines whether or not to terminate the processing. In a case where the control unit 5 determines not to terminate the processing, the processing returns to step S101. On the other hand, in a case where the control unit 5 determines to terminate the processing, the control unit 5 terminates the processing.

As described above, according to the pull-out heating cooking apparatus 100, the rotation direction and the rotation speed of the centrifugal fan 142 are controlled. As a result, a predetermined region in the heating cooking chamber 100A can be effectively heated.

Second Embodiment

Figure 12:
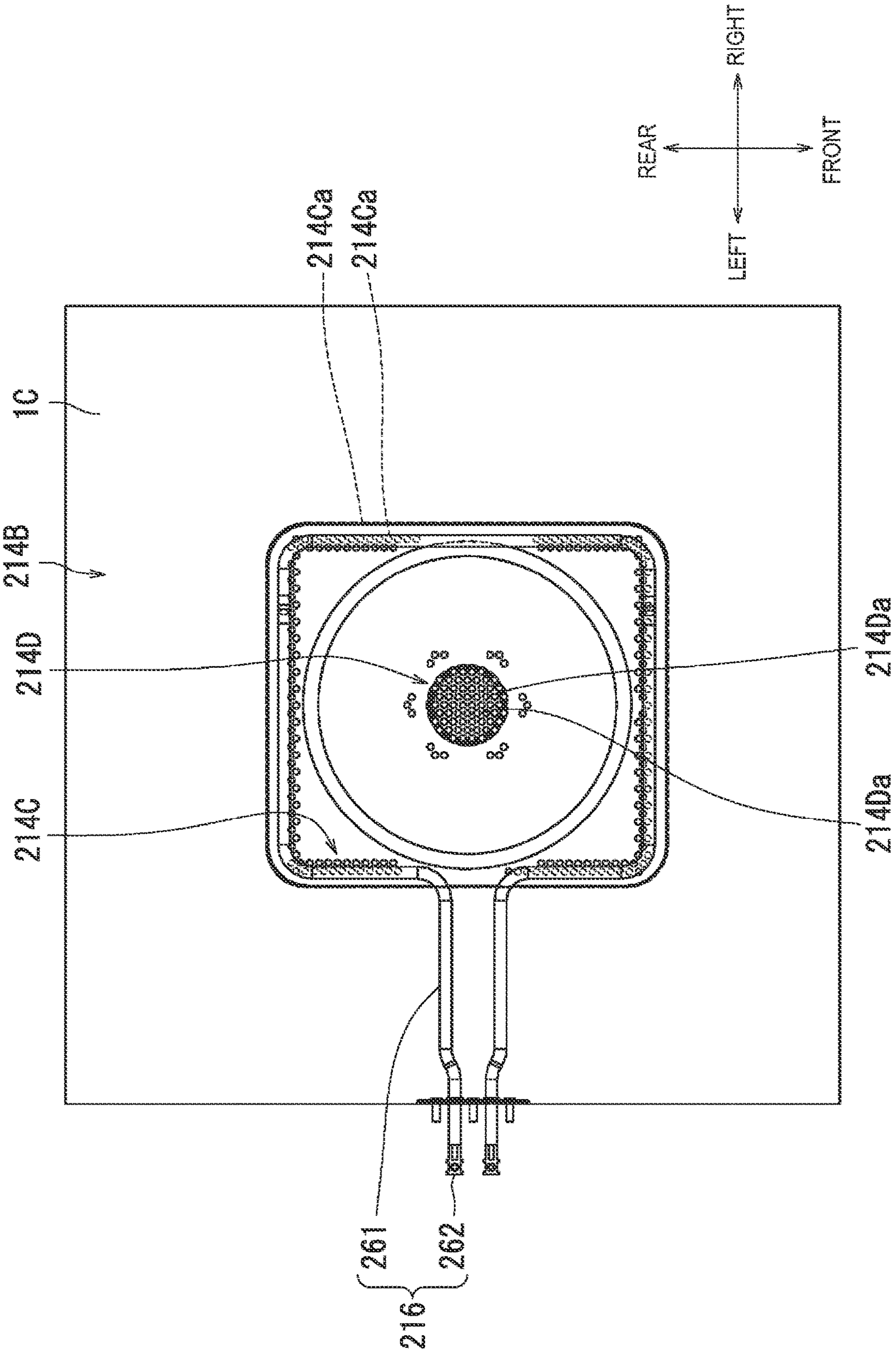
FIG. 12 is a diagram illustrating a partitioning member and a first heater according to a second embodiment of the present invention.

Next, a pull-out heating cooking apparatus 100 according to a second embodiment will be described with reference to FIG. 12. FIG. 12 is a diagram illustrating a partitioning member 214B and a first heater 261 according to the second embodiment. In the second embodiment, a region in which a plurality of punched holes 14Ca are arranged and the shape of the first heater 261 are different from those in the first embodiment.

As illustrated in FIG. 12, an air sending unit 14 includes a heating chamber 14A, a centrifugal fan 142, a drive unit 143, a partitioning member 214B, and a second heater 141. A blow-out hole portion 214C surrounds a suction hole portion 214D. Specifically, the suction hole portion 214D is positioned at the center portion of the partitioning member 214B. A set of a plurality of punched holes 214Da of the suction hole portion 214D has, for example, a circular shape. On the other hand, the blow-out hole portion 214C is formed along the outer circumference of the suction hole portion 214D. A set of a plurality of punched holes 214Ca of the blow-out hole portion 214C has, for example, a rectangular ring shape.

A grill unit 216 includes a first heater 261 and an energization unit 262. The first heater 261 has a substantially rectangular ring shape when viewed upward from below. More specifically, it is preferable that the position of the blow-out hole portion 214C and the position of the first heater 261 overlap each other when viewed upward from below. In more detail, the positions of at least some punched holes 214Ca among the plurality of punched holes 214Ca overlap the position of the first heater 261 when viewed upward from below. In addition, a control unit 5 controls the energization unit 262 so that the first heater 261 is set to at a predetermined temperature.

Figure 13:
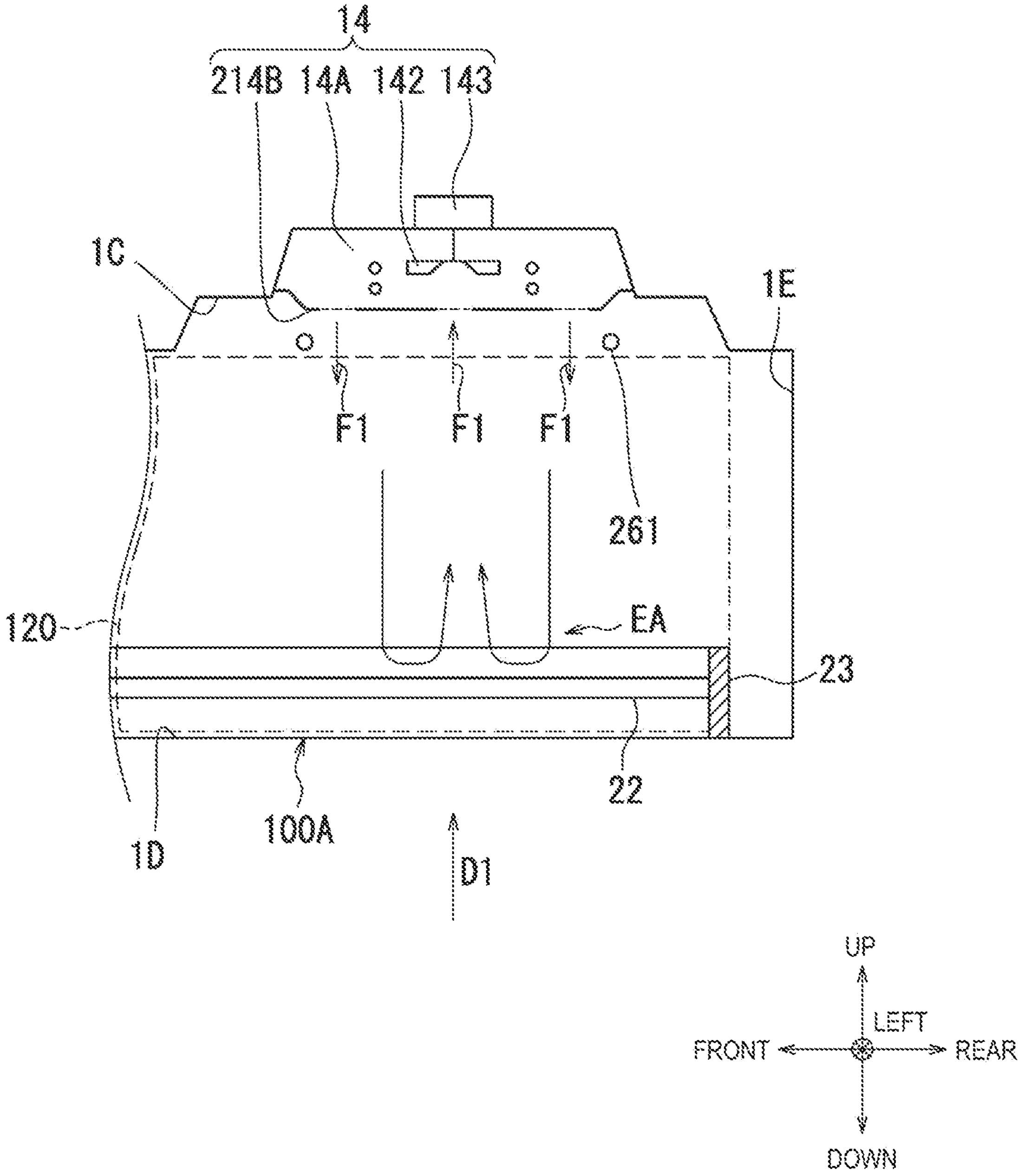
FIG. 13 is a diagram illustrating a cross section of a heating cooking chamber taken along a plane orthogonal to a left-right direction in a pull-out heating cooking apparatus according to the second embodiment.

The flow of hot air F1 will be described in detail with reference to FIG. 13. FIG. 13 illustrates a cross section of a heating cooking chamber 100A taken along a plane orthogonal to a left-right direction.

As illustrated in FIG. 13, the air sending unit 14 suctions the hot air F1 in the heating cooking chamber 100A into the heating chamber 14A through the plurality of punched holes 214Ca with the centrifugal fan 142. The air sending unit 14 blows the hot air F1 in the heating chamber 14A out toward the first heater 261 through the plurality of punched holes 214Ca with the centrifugal fan 142. At least some of the hot air F1 hits the first heater 261. As a result, at least some of the hot air F1 is heated by the first heater 261 at a predetermined temperature. In addition, the blow-out direction of at least some of the hot air F1 changes, and the hot air F1 is dispersed.

According to the pull-out heating cooking apparatus 100 of the present invention, at least some of the hot air F1 hits the first heater 261 and is heated. As a result, the hot air F1 is dispersed, and heating unevenness of an object H to be heated can be reduced.

Third Embodiment

Figure 14:
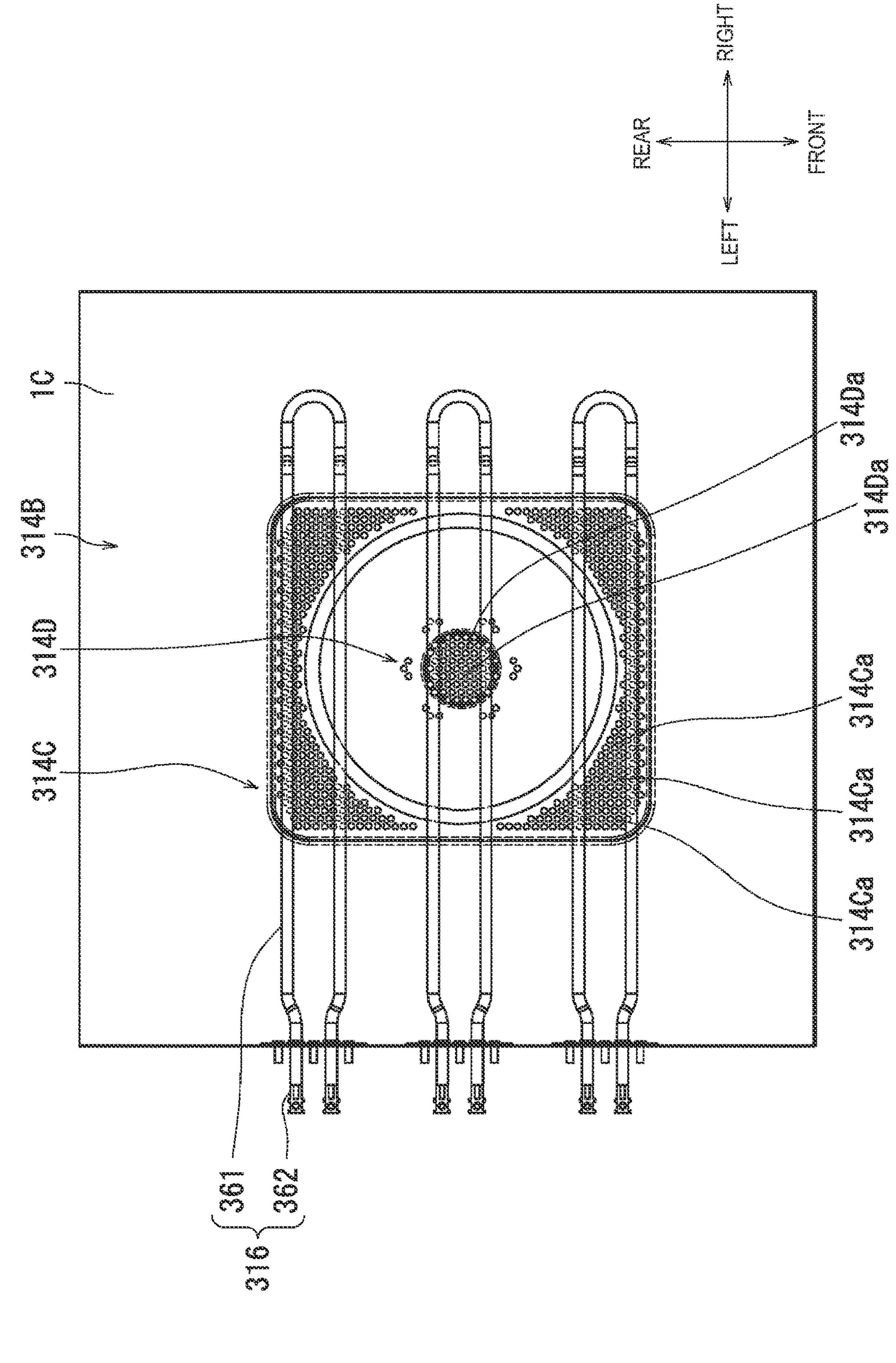
FIG. 14 is a diagram illustrating a partitioning member and a first heater according to a third embodiment of the present invention.

Next, a pull-out heating cooking apparatus 100 according to a third embodiment will be described with reference to FIG. 14. FIG. 14 is a diagram illustrating a partitioning member 314B and a first heater 361 according to the third embodiment. The third embodiment is different from the first embodiment in that a blow-out hole portion 314C is a set of a large number of punched holes 314Ca.

As illustrated in FIG. 14, an air sending unit 14 includes a heating chamber 14A, a centrifugal fan 142, a drive unit 143, a partitioning member 314B, and a second heater 141. The blow-out hole portion 314C surrounds a suction hole portion 314D. Specifically, the suction hole portion 314D is positioned at the center portion of the partitioning member 314B. A set of a large number of punched holes 314Da of the suction hole portion 314D has, for example, a circular shape. On the other hand, the blow-out hole portion 314C is formed along the outer circumference of the suction hole portion 314D. The set of the large number of punched holes 314Ca of the blow-out hole portion 314C has, for example, an annular shape. In addition, a control unit 5 controls an energization unit 362 so that the first heater 361 is set to be at a predetermined temperature.

A grill unit 316 includes the first heater 361 and the energization 362. The first heater 361 has a substantially U shape when viewed from the lower side to the upper side. More specifically, it is preferable that the position of the blow-out hole portion 314C, the position of the suction hole portion 314D, and the position of the first heater 361 overlap each other when viewed from the lower side to the upper side. In more detail, the positions of at least some punched holes 314Ca among the plurality of punched holes 314Ca overlap the position of the first heater 361 when viewed from the lower side to the upper side. In addition, the positions of at least some punched holes 314Da among the plurality of punched holes 314Da overlap the position of the first heater 361 when viewed from the lower side to the upper side.

Figure 15:
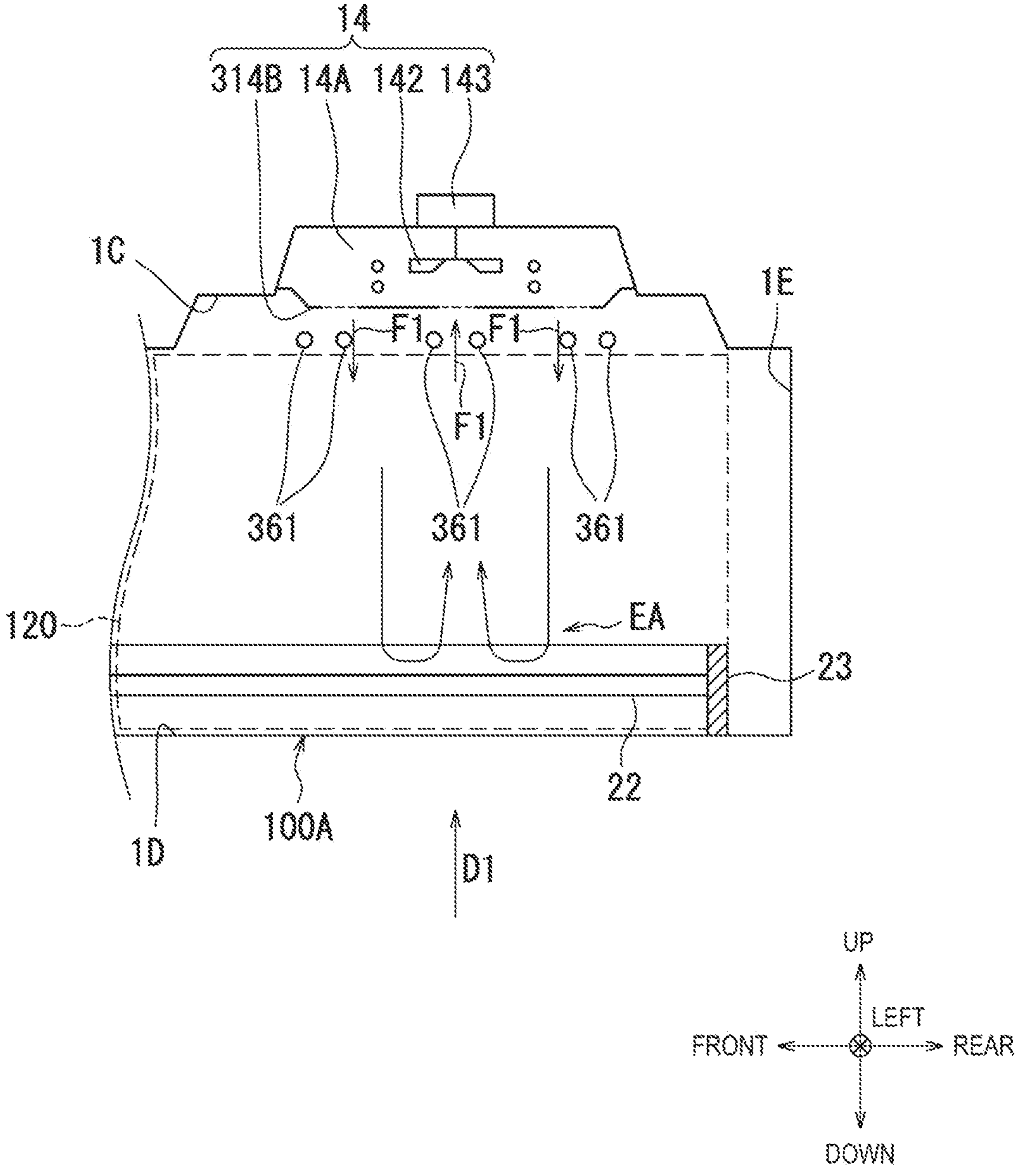
FIG. 15 is a diagram illustrating a cross section of a heating cooking chamber taken along a plane orthogonal to a left-right direction in a pull-out heating cooking apparatus according to the third embodiment.

A flow of the hot air F1 will be described in detail with reference to FIG. 15. FIG. 15 illustrates a cross section of the heating cooking chamber 100A taken along a plane orthogonal to a left-right direction.

As illustrated in FIG. 15, the air sending unit 14 suctions the hot air F1 in the heating cooking chamber 100A into the heating chamber 14A through the large number of punched holes 314Ca by the centrifugal fan 142. When the hot air F1 is suctioned into the heating chamber 14A, at least some of the hot air F1 hits the first heater 361. As a result, at least some of the hot air F1 is heated by the first heater 361 at a predetermined temperature. In addition, the air sending unit 14 blows out the hot air F1 in the heating chamber 14A toward the first heater 361 through the large number of punched holes 314Ca by the centrifugal fan 142. At least some of the hot air F1 hits the first heater 361. As a result, at least some of the hot air F1 is heated by the first heater 361 at a predetermined temperature. In addition, the blow-out direction of at least some of the hot air F1 changes, and the hot air F1 is dispersed.

According to the pull-out heating cooking apparatus 100 of the present invention, at least some of the hot air F1 hits the first heater 361 and is heated. As a result, the hot air F1 is dispersed, and heating unevenness of an object H to be heated can be reduced. Further, at least some of the hot air F1 hits the first heater 361 even when the hot air F1 is suctioned, and thus it is possible to maintain the temperature of the hot air F1 at a high temperature and satisfactorily cook the object H to be heated.

Fourth Embodiment

Figure 16:
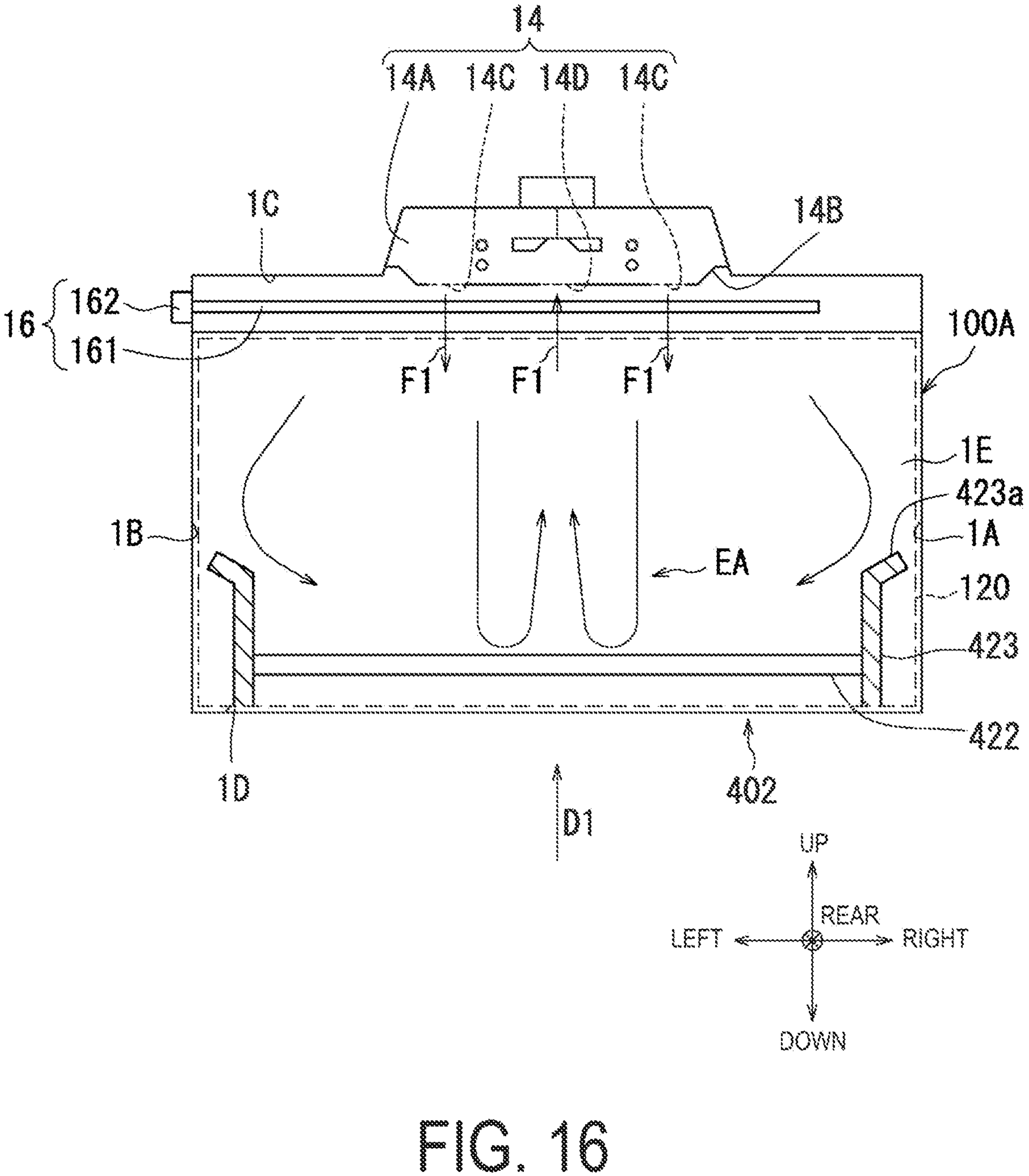
FIG. 16 is a diagram illustrating a cross section of a heating cooking chamber taken along a plane orthogonal to a front-rear direction in a pull-out heating cooking apparatus according to a fourth embodiment.

Next, a pull-out heating cooking apparatus 100 according to a fourth embodiment will be described with reference to FIG. 16. FIG. 16 illustrates a cross section of the heating cooking chamber 100A taken along a plane orthogonal to a front-rear direction. In the fourth embodiment, the shape of a support portion 423 of a pull-out body 402 is different from that in the first embodiment.

As illustrated in FIG. 16, the pull-out body 402 includes a door portion 21, a placing portion 422, and the support portion 423. The support portion 423 is an example of a sidewall portion. The support portion 423 is erected at a peripheral portion of the placing portion 422. An upper end of the support portion 423 has a protrusion portion 423*a* that protrudes outward from the placing portion 422. It is preferable that the upper end of the support portion 423 be inclined toward the placing portion 422. Further, the blow-out hole portion 14C is positioned further inside than the support portion 423. Thus, it is possible to prevent hot air F1 from moving to the outside of the pull-out body 402, and to increase thermal efficiency for an object H to be heated.

As illustrated in FIG. 16, the air sending unit 14 suctions the hot air F1 in the heating cooking chamber 100A into the heating chamber 14A through the suction hole portion 314D by the centrifugal fan 142. The air sending unit 14 blows the hot air F1 in the heating chamber 14A into the heating cooking chamber 100A through the blow-out hole portion 314C by the centrifugal fan 142. The hot air F1 blown out into the heating cooking chamber 100A moves downward. The hot air F1 moving within the heating cooking chamber 100A is heated by the first heater 161. The air blown out toward the first heater 161 is guided to the center portion of the placing portion 422 by the protrusion portion 423*a*. Thereafter, the hot air F1 reaches a predetermined region EA in the heating cooking chamber 100A.

According to the pull-out heating cooking apparatus 100 of the present invention, the upper face of the placing portion 422 of the pull-out body 402 can be heated in a shorter period of time.

The embodiments of the present invention have been described above with reference to the drawings (FIG. 1 to FIG. 16). However, the present invention is not limited to the embodiment described above, and the present invention can be implemented in various modes without departing from the gist of the disclosure. The drawings primarily schematically illustrate each of the constituent elements for the sake of easier understanding, and the thickness, length, quantity, and the like of each of the illustrated constituent elements are different from the actual thickness, length, quantity, and the like by reason of creation of the drawings. The material, shape, dimensions, and the like of each of the constituent elements illustrated in the embodiment described above are merely exemplary and are not particularly limiting, and various modifications can be made within the scope not departing from the effects of the present invention in essence.

(1) As described with reference to FIG. 1 to FIG. 16, the pull-out heating cooking apparatus 100 includes the air sending unit 14, but the present invention is not limited thereto. For example, the pull-out heating cooking apparatus 100 may further include an air sending unit different from the air sending unit 14.

(2) The pull-out heating cooking apparatus 100 may include a microwave supply unit that supplies microwaves to the heating cooking chamber 100A.

(3) As described with reference to FIG. 1 to FIG. 16, the blow-out hole portion 14C and the suction hole portion 14D are respectively a set of the plurality of punched holes 14Ca and a set of the plurality of punched holes 14Da, but the present invention is not limited thereto. For example, each of the blow-out hole portion 14C and the suction hole portion 14D may be one opening portion, may be a plurality of slit holes, or may be a net-like member.

(4) As described with reference to FIG. 1 to FIG. 16, the predetermined direction D1 is a direction along a vertical upward direction, but the present invention is not limited thereto. For example, the first direction may be along a horizontal direction. More specifically, the suction hole portion 14D and the blow-out hole portion 14C may be disposed on the right wall 1A, the left wall 1B, and the back wall 1E.

(5) As described with reference to FIG. 1 to FIG. 16, the pull-out heating cooking apparatus 100 includes the pull-out body 2, but the present invention is not limited thereto. For example, the pull-out heating cooking apparatus 100 may include a rotary table on the bottom wall 1D without including the pull-out body 2.

INDUSTRIAL APPLICABILITY

The present invention is useful in the field of a heating cooking apparatus, for example.

REFERENCE SIGNS LIST

1 Heating chamber
14 Air sending unit
14B Partitioning member
14C Blow-out hole portion
14D Suction hole portion
141 Second heater
142 Centrifugal fan
100 Pull-out heating cooking apparatus
100A Heating cooking chamber
120 Accommodation space

The invention claimed is:

1. A heating cooking apparatus comprising:

a heating cooking chamber configured to accommodate an object to be heated;

an air sending unit configured to supply hot air to the heating cooking chamber; and a first heater positioned in the heating cooking chamber and configured to heat the object to be heated, wherein the air sending unit includes;

a suction hole portion positioned on a predetermined side of the heating cooking chamber, a blow-out hole portion positioned on the predetermined side, a heating chamber, a second heater, a centrifugal fan, and a partitioning member, the air sending unit suctions air inside the heating cooking chamber through the suction hole portion and blows the hot air out toward the first heater through the blow-out hole portion, the second heater and the centrifugal fan are accommodated in the heating chamber, the suction hole portion and the blow-out hole portion are disposed in the partitioning member, the partitioning member is disposed on a top wall of the heating cooking chamber between the heating chamber and the heating cooking chamber, and the first heater is positioned at an upper portion in the heating cooking chamber and below the partitioning member.

2. The heating cooking apparatus according to claim 1, wherein the suction hole portion positions between and overlaps the centrifugal fan and a portion of the first heater, the blow-out hole portion positions between the centrifugal fan and another portion of the first heater, and the air sending unit suctions the air inside the heating cooking chamber through the portion of the first heater and the suction hole portion, and blows the hot air out through the blow-out hole portion and toward the other portion of the first heater.

* * * * *